(12) United States Patent
Whiteley et al.

(10) Patent No.: US 9,304,736 B1
(45) Date of Patent: Apr. 5, 2016

(54) VOICE CONTROLLED ASSISTANT WITH NON-VERBAL CODE ENTRY

(71) Applicant: Rawles LLC, Wilmington, DE (US)

(72) Inventors: Michael Dale Whiteley, Seattle, WA (US); Fred Torok, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 385 days.

(21) Appl. No.: 13/865,878

(22) Filed: Apr. 18, 2013

(51) Int. Cl.
*H03G 3/20* (2006.01)
*G06F 3/16* (2006.01)

(52) U.S. Cl.
CPC ...................................... *G06F 3/167* (2013.01)

(58) Field of Classification Search
USPC ............... 348/14.03; 345/173; 379/88.18; 70/278.1, 278.2; 381/56, 62, 110, 111, 381/122
See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2002/0097848 A1* | 7/2002 | Wesemann et al. | 379/88.18 |
| 2009/0140993 A1* | 6/2009 | Han et al. | 345/173 |
| 2012/0024024 A1* | 2/2012 | Faber et al. | 70/278.1 |
| 2012/0223885 A1 | 9/2012 | Perez | |
| 2012/0281057 A1* | 11/2012 | Couse | 348/14.03 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Vivian Chin
*Assistant Examiner* — Friedrich W Fahnert
(74) *Attorney, Agent, or Firm* — Lee & Hayes, PLLC

(57) ABSTRACT

A voice controlled assistant has a housing to hold one or more microphones, one or more speakers, and various computing components. The voice controlled assistant facilitates transactions and other functions primarily through verbal interactions with a user. In some situations, a transaction may require entry of a code, which the user may wish to enter in a non-verbal way. A control knob is rotatably mounted to the housing and non-verbal manual entry of the code may be accomplished via rotations of the control knob. In other implementations, the code may be entered through use of a companion application executing on another device separate from the voice controlled assistant.

22 Claims, 12 Drawing Sheets

VOICE CONTROLLED ASSISTANT WITH NON-VERBAL CODE ENTRY

BACKGROUND

Homes are becoming more connected with the proliferation of computing devices such as desktops, tablets, entertainment systems, and portable communication devices. As these computing devices evolve, many different ways have been introduced that allow users to interact with computing devices, such as through mechanical devices (e.g., keyboards, mice, etc.), touch screens, motion, and gesture. Another way to interact with computing devices is through speech.

To implement speech interaction, a device is commonly equipped with a microphone to receive voice input from a user and a speech recognition component to recognize and understand the voice input. The device also commonly includes a speaker to emit audible responses to the user. With speech interaction, the device may be operated essentially "hands free".

For some operations, however, voice interaction may not be intuitive or easily implemented. Additionally, in some contexts, audio exchanges may not be appropriate for the desired user experience. For instance, suppose the user is conducting a transaction or engaging in an exchange that involves sharing private information, such as a personal identification number (PIN), social security number (SSN), or the like. In these cases, a pure audio exchange may not be suitable, particularly if the user does not wish to verbally share the private information while other people are in the same vicinity.

Accordingly, there is a continuing need for improved designs of voice enabled devices that are intuitive and easy to operate and yet provide different forms of exchanges to accommodate and enhance various user experiences.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
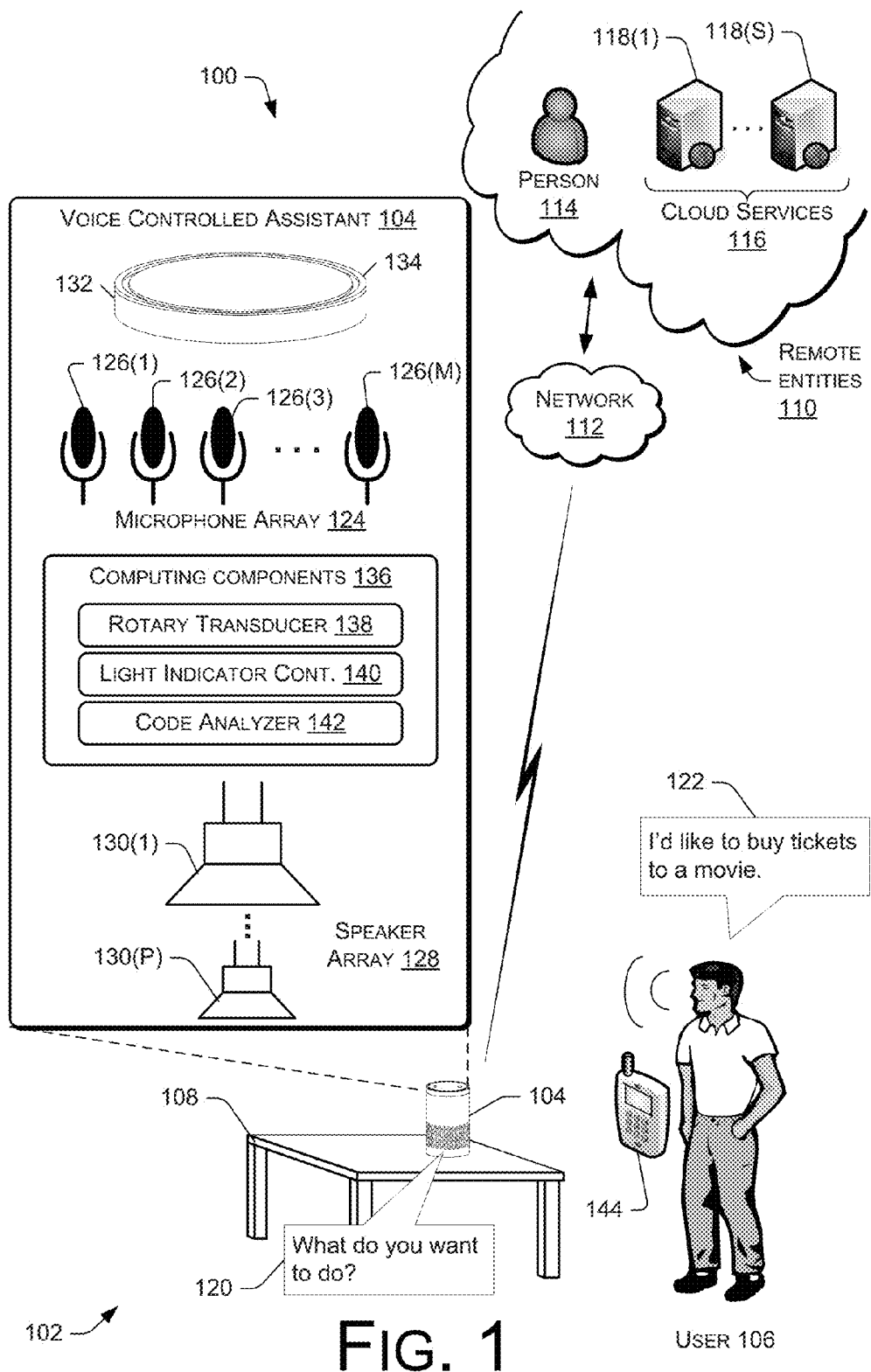
FIG. 1 shows an illustrative voice interactive computing architecture set in an example environment that includes a local user (i.e., near end talker) communicating with a remote person (i.e., far end talker) or cloud service through use of a voice controlled assistant.

A voice controlled assistant having an integrated manual control knob with light indicator is described, along with techniques for non-verbally entering a code using the control knob. The voice controlled assistant is discussed in the context of an architecture in which the assistant is connected to remote people (i.e., far end talkers) or a network accessible computing platform, or "cloud service", via a network. The voice controlled assistant may be implemented as a hands-free device equipped with a wireless LAN (WLAN) interface. The voice controlled assistant relies primarily, if not exclusively, on voice interactions with a user. However, for certain operations, the manual control knob provides an intuitive mechanical means for user input and the light indicator facilitates intuitive and useful non-audio feedback to enhance user experience.

To illustrate one example usage scenario, the voice controlled assistant may be positioned in a room (e.g., at home, work, store, etc.) to receive user input in the form of voice interactions, such as spoken requests or a conversational dialogue. Depending on the request, the voice controlled assistant may perform any number of actions or functions. For instance, the assistant may play music or emit verbal answers to the user. The assistant may alternatively function as a communication device to facilitate network voice communications with a far end talker. As still another alternative, the user may ask a question or submit a search request to be performed by a remote cloud service. For instance, the user's voice input may be transmitted from the assistant over a network to the cloud service, where the voice input is interpreted and used to perform a function. In the event that the function creates a response, the cloud service transmits the response back over the network to the assistant, where it may be audibly emitted to the user.

When using speech as the primary interaction, however, the user may encounter situations when the hands-free device is not as intuitive or easy to operate as might be expected or desired. For instance, suppose the user is in the midst of a conversation using the voice controlled assistant and the user would like to adjust the volume of the audio output. In a purely voice controlled mode of operation, the device expects to receive the command vocally. However, it may be difficult for the device to differentiate between words in the conversation and a volume control command. To alleviate this potential confusion, the voice controlled assistant is constructed with an integrated control knob that allows the user to make certain adjustments manually through use of the knob. For instance, the user may adjust the volume via the control knob while conducting the verbal conversation.

In another example usage scenario, the voice controlled assistant may be used to engage in transactions, such as financial or sale transactions. Suppose, for example, the user employs the voice controlled assistant to engage in an e-commerce transaction or an online banking transaction. In such situations, as part of the transaction, the user may be asked to enter a code, such as a personal identification number (PIN), social security number (SSN), driver's license, account number, verification identifier, and so forth. Verbal entry of this code may not be suitable in some situations where privacy is a concern, such as when other people are near to the user. Accordingly, according to aspects described herein, the control knob is used to facilitate non-verbal entry of the code. For instance, the user may enter the code through a series of rotations of the control knob (e.g., right 5 positions, left 9 positions, and so forth). The user may know the code already, or be provided with a code during the transaction, such as receiving a transaction-specific code to an application executing on a separate communication device associated with the user (e.g., smart phone, personal digital assistant, tablet, etc.).

Furthermore, in some contexts, exclusive audio feedback may not be suitable. For instance, when the user is in the midst of a conversation, an audio signal or indication may be inappropriate because it interrupts the conversation, or may even go undetected by the user. Accordingly, the voice controlled assistant is further constructed with a light indicator to convey visual, non-audio messages or feedback to the user. The light indicator may be configured to provide multiple different types of indications. In one implementation, the light indicator is constructed to emit multi-color light from multiple segments according to any on/off, intensity differences, or animation/sequencing pattern, thereby providing an essentially unlimited variety of indications.

The architecture may be implemented in many ways. Various example implementations are provided below. However, the architecture may be implemented in many other contexts and situations different from those shown and described below.

FIG. 1 shows an illustrative architecture 100, set in an exemplary environment 102, which includes a voice controlled assistant 104. In this example, the environment may be a room or an office, and a user 106 is present to interact with the voice controlled assistant 104. Although only one user 106 is illustrated in FIG. 1, multiple users may use the voice controlled assistant 104. The user 106 may be located proximal to the voice controlled assistant 104, and hence serve as a near end talker in some contexts.

In this illustration, the voice controlled assistant 104 is physically positioned on a table 108 within the environment 102. The voice controlled assistant 104 is shown sitting upright and supported on its base end. In other implementations, the assistant 104 may be placed in any number of locations (e.g., ceiling, wall, in a lamp, beneath a table, on a work desk, in a hall, under a chair, etc.). The voice controlled assistant 104 is shown communicatively coupled to remote entities 110 over a network 112. The remote entities 110 may include individual people, such as a person 114, or automated systems (not shown) that serve as far end talkers to verbally interact with the user 106. The remote entities 110 may alternatively comprise cloud services 116 hosted, for example, on one or more servers 118(1), . . . , 118(S). These servers 118(1)-(S) may be arranged in any number of ways, such as server farms, stacks, and the like that are commonly used in data centers.

The cloud services 116 generally refer to a network accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process the user input received from the voice controlled assistant 104, and produce a suitable response. Example applications might include web browsing, online shopping, banking, bill payment, email, work tools, productivity, entertainment, educational, and so forth.

In FIG. 1, the user 106 is shown communicating with the remote entities 110 via the voice controlled assistant 104. In the illustrated scenario, the voice controlled assistant 104 outputs an audible question, "What do you want to do?" as represented by dialog bubble 120. This output may represent a question from a far end talker 114, or from a cloud service 116 (e.g., an entertainment service). The user 106 is shown replying to the question by stating, "I'd like to buy tickets to a movie" as represented by the dialog bubble 122. In some implementations, the voice controlled assistant 104 is equipped with a text-to-speech (TTS) engine that generates voice audio output from text-based content received from the remote entities 110. This TTS engine may, in other implementations, be located at the remote entities 110 to convert the text content to an audio output signal, which is then transmitted to the voice controlled assistant 104.

The voice controlled assistant 104 is equipped with an array 124 of microphones 126(1), . . . , 126(M) to receive the voice input from the user 106 as well as any other audio sounds in the environment 102. The microphones 126(1)-(M) are generally arranged at a first or top end of the assistant 104 opposite the base end seated on the table 108, as will be described in more detail with reference to FIGS. 3, 6, and 7. Although multiple microphones are illustrated, in some implementations, the assistant 104 may be embodied with only one microphone.

The voice controlled assistant 104 may further include a speaker array 128 of speakers 130(1), . . . , 130(P) to output sounds in humanly perceptible frequency ranges. The speakers 130(1)-(P) may be configured to emit sounds at various frequency ranges, so that each speaker has a different range. In this manner, the assistant 104 may output high frequency signals, mid frequency signals, and low frequency signals. The speakers 130(1)-(P) are generally arranged at a second or base end of the assistant 104 and oriented to emit the sound in a downward direction toward the base end and opposite to the microphone array 124 in the top end. One particular arrangement is described below in more detail with reference to FIG. 7. Although multiple speakers are illustrated, the assistant 104 may be embodied with only one speaker in other implementations.

The voice controlled assistant 104 is further configured with a control knob 132 to control any number of aspects, such as volume, treble, base, radio band selection, menu navigation, and so forth. The control knob 132 permits manual adjustment without use of verbal commands. For instance, the user can adjust volume while conducting a contemporaneous verbal conversation. Furthermore, the control knob 132 may be used to facilitate non-verbal entry of codes. For instance, suppose the user proceeds to purchase tickets to the movie. As part of this transaction, the entertainment system may ask the user to enter a code to verify the transaction. The user may manually turn the control knob 132 through a series of rotations to enter the code. This non-verbal input allows the user to enter the code without saying the code out loud to the assistant 104. The control knob is described below in more detail with reference to FIGS. 3-5 and 7. Its use to enter a code is described below in more detail with reference to FIGS. 10-13.

The voice controlled assistant 104 may further include a light indicator 134 to provide non-audio, visual indications to the user. In one implementation, the light indicator 134 is integrated with the control knob 132, such as a light edge pipe around an externally exposed lip or peripheral edge of the control knob 132 to permit viewing from all directions. The light indicator 134 may be configured with multiple LEDs to provide multiple colored light segments that can be actively controlled to exhibit essentially any color, sequence, or effect. The light indicator 134 may be used to provide visual cues or feedback to the user. Various functions or activities may be programmatically associated with different indication or appearance states of the light indicator 134. For instance, the light indicator 134 may take on a first appearance (e.g., solid green color) when the assistant 104 is active and awaiting input, and a second appearance (e.g., solid red color) when a pending message has been received. The light indicator 134 may further produce a third appearance (e.g., flashing color) when providing a notice or warning to the user and a fourth appearance (e.g., sequential clockwise/counterclockwise on/off pattern) when the user is adjusting the control knob. Other examples of possible events that may be assigned to various appearances of the light indicator include alerts, reminders, calendar events, call waiting, arrival of a message (e.g., voicemail, email, text, etc.), mute on/off, recording active, security event (e.g., detecting a presence of an intruder through audible sound), amplitude of speaker's voice, direction of voice source, power, connection to a Wi-Fi network, weather (e.g., temperature, pressure, etc.), timer, and so forth.

Moreover, the light indicator 134 may be used to help the user enter a code. For instance, the light indicator 134 may be configured to provide a spectrum of colors from a first color when the knob is first used through one or more other colors a as the knob is turned. In such configurations, a code may be color based, such as a sequence of colors (e.g., rotate the knob right and left to achieve a color sequence of Yellow-Red-Blue-Green). A more detailed of one particular configuration of the light indicator is described below with reference to FIGS. 3 and 7-9.

The voice controlled assistant 104 may further include computing components 136 that process the voice input received by the microphone array 124, enable communication with the remote entities 110 over the network 112, and generate the audio to be output by the speaker array 128. The computing components 136 are generally positioned between the microphone array 124 and the speaker array 128, although essentially any other arrangement may be used. One collection of additional computing components 136 are illustrated and described with reference to FIG. 2.

Among the computing components 136 are a rotary transducer 138, a light indicator controller 140, and a code analyzer 142. The rotary transducer 138 receives input from the manual control knob 132 that is rotatably mounted on the assistant 104. The rotary transducer 138 translates the mechanical movement of the knob to a control signal for controlling any number of aspects, such as volume, treble, base, radio band selection, menu navigation, and so forth. The light indicator controller 140 controls operation of the light indicator 134. More specifically, the light indicator controller 140 programmatically associates various functions with the different indication states that the light indicator 134 can exhibit. If the light indicator 134 is a multi-color, multi-segment indicator, the controller 140 may further determine which ring segments to illuminate, which colors to use, a timing to illuminate the segments, and whether to follow a pattern, sequence, or animation.

The code analyzer 142 receives the knob input, as translated by the rotary transducer 138, to form a code. Said another way, the code analyzer 142 may be configured to interpret the knob rotations into a code. In some implementations, the code analyzer 142 provides the code to the remote entities that requested a confirmation. In other implementations, the code analyzer 142 may further assess the entered code for local verification or confirmation.

The code may be a value or identifier that is pre-known to the user, such as a telephone number, address, social security number, driver's license, PIN, and so forth. Alternatively, the code may be a transaction-based temporary identifier that is unknown to the user 106, but provided during the transaction. For instance, in another implementation, the user may have an associated computing or communication device 144 (e.g., smart phone, PDA, tablet, laptop, etc.) that runs an application to facilitate operation of the voice controlled assistant 104. As part of a transaction, the remote entities 110 may send a transaction code to the application on the associated device 144. The user can then read the code in privacy and enter the code using the control knob 132 to confirm the transaction. To continue our example, suppose the user 106 orders the movie ticket and in response receives, on his personal device 144, a code of R5, L9, and R3 to confirm purchase of a movie ticket. The user may then enter this code by rotating, for example, the knob right to position 5, left to position 9, and right to position three.

Figure 2:
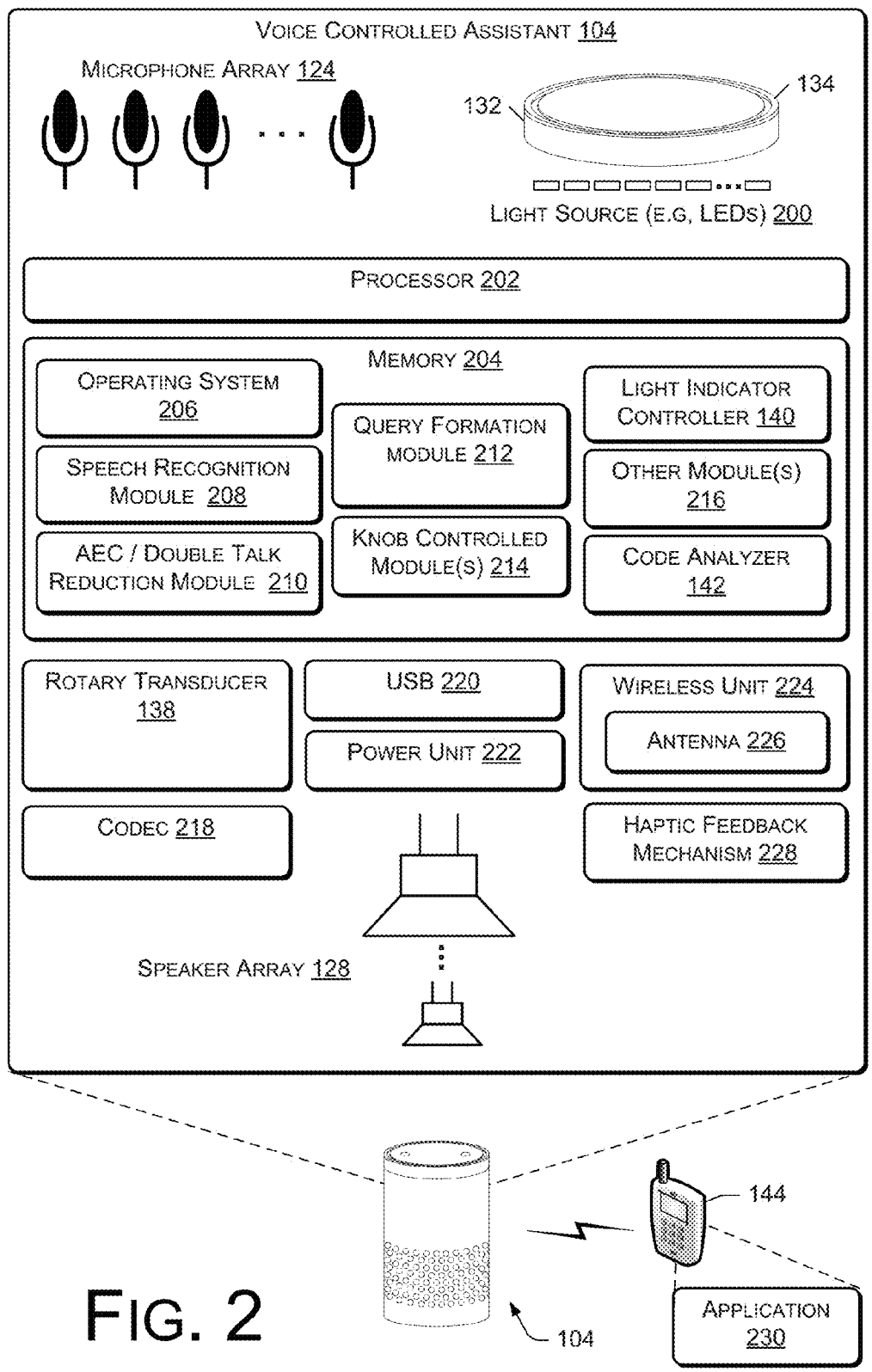
FIG. 2 shows a block diagram of selected functional components implemented in the voice controlled assistant of FIG. 1.

FIG. 2 shows selected functional components of the voice controlled assistant 104 in more detail. Generally, the voice controlled assistant 104 may be implemented as a standalone device that is relatively simple in terms of functional capabilities with limited input/output components, memory, and processing capabilities. For instance, the voice controlled assistant 104 may not have a keyboard or keypad. Nor does it have a display or touch screen to facilitate visual presentation and user touch input. Instead, the assistant 104 may be implemented with the ability to receive and output audio, a network interface (wireless or wire-based), power, and limited processing/memory capabilities.

In the illustrated implementation, the voice controlled assistant 104 includes the microphone array 124, the speaker array 128, a control knob 132, a light indicator 134 as described above with respect to FIG. 1. The microphone array 124 may be used to capture speech input from the user 106, or other sounds in the environment 102. The speaker array 128 may be used to output speech from a far end talker, audible responses provided by the cloud services, forms of entertainment (e.g., music, audible books, etc.), or any other form of sound. The speaker array 128 may output a wide range of audio frequencies including both human perceptible frequencies and non-human perceptible frequencies. The control knob 132 permits manual input for various assignable activities, and the light indicator 134 provides visual, non-audio feedback to the user. In the illustrated implementation, the light indicator 134 includes an edge pipe provided at an outer lip of the control knob 132 and a light source 200 optically coupled to deliver light to the edge pipe. The light source 200 may be comprised of one or more light emitting diodes (LEDs), which may further be multi-color LEDs. In one implementation, the light indicator has twelve LEDs 200 that provide twelve distinct color segments that are individually controllable.

The voice controlled assistant 104 further includes a processor 202 and memory 204. The processor 202 may be implemented as any form of processing component, including a microprocessor, control logic, application-specific integrated circuit, and the like. The memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

Several modules such as instruction, datastores, and so forth may be stored within the memory 204 and configured to execute on the processor 202. An operating system module 206 is configured to manage hardware and services (e.g., wireless unit, USB, Codec) within and coupled to the assistant 104 for the benefit of other modules. Several other modules may be provided to process verbal input from the user 106. For instance, a speech recognition module 208 provides some level of speech recognition functionality. In some implementations, this functionality may be limited to specific commands that perform fundamental tasks like waking up the device, configuring the device, and the like. The amount of speech recognition capabilities implemented on the assistant 104 is an implementation detail, but the architecture described herein can support having some speech recognition at the local assistant 104 together with more expansive speech recognition at the cloud services 116.

An acoustic echo cancellation (AEC) and double talk reduction module 210 are provided to process the audio signals to substantially cancel acoustic echoes and substantially reduce double talk that may occur. This module 210 may, for example, identify times where echoes are present, where double talk is likely, where background noise is present, and attempt to reduce these external factors to isolate and focus on the near talker. By isolating on the near talker, better signal quality is provided to the speech recognition module 208 to enable more accurate interpretation of the speech utterances.

A query formation module 212 may also be provided to receive the parsed speech content output by the speech recognition module 208 and to form a search query or some form of request. This query formation module 212 may utilize natural language processing (NLP) tools as well as various language modules to enable accurate construction of queries based on the user's speech input.

One or more knob controlled modules 214 may also be stored in the memory 204 to receive control signals from the rotary transducer 138 and modify operation of corresponding applications or functionality. Examples of knob-controlled modules 214 may include modules that facilitate volume control, other audio control (e.g., base, treble, etc.), menu navigation, radio band selection, and so forth.

The light indicator controller 140 may also be implemented to execute on the processor 202 to assign various functions to corresponding indication states exhibited by the light indicator 134. More specifically, the light indicator controller 140 individually controls each of the LEDs 200 to provide any number of visual appearances for the light indicator 134. The light indicator controller determines which of the LEDs 200 to illuminate, when individual LEDs should be illuminated, their respective color, and whether to apply a pattern or animation effect.

The modules shown stored in the memory 204 are merely representative. Other modules 216 for processing the user voice input, interpreting that input, and/or performing functions based on that input may be provided.

The code analyzer 142 is also shown implemented as a software or firmware module stored in the memory 204 for execution on the processor(s) 202. The code analyzer 142 is coupled to receive the data or signal from the rotary transducer 138 and to interpret the knob movement as values or portions of a code. As the user turns the knob right to a particular position or a number of times or until a particular color is shown, the code analyzer 142 analyzes the movement in the context of the why the code is being used. Based on this analysis, the code analyzer 142 determines a string of values or portions that form a complete code. The code analyzer 142 may then verify the code locally, or sent the code to the remote entities 110 for verification.

The voice controlled assistant 104 might further include a codec 218 coupled to the microphones of the microphone array 124 and the speakers of the speaker array 128 to encode and/or decode the audio signals. The codec 218 may convert audio data between analog and digital formats. A user may interact with the assistant 104 by speaking to it, and the microphone array 124 captures the user speech. The codec 218 encodes the user speech and transfers that audio data to other components. The assistant 104 can communicate back to the user by emitting audible statements passed through the codec 218 and output through the speaker array 128. In this manner, the user interacts with the voice controlled assistant simply through speech, without use of a keyboard or display common to other types of devices.

A USB port 220 may further be provided as part of the assistant 104 to facilitate a wired connection to a network, or a plug-in network device that communicates with other wireless networks. In addition to the USB port 220 or as an alternative thereto, other forms of wired connections may be employed, such as a broadband connection. A power unit 222 is further provided to distribute power to the various components on the assistant 104.

The voice controlled assistant 104 includes a wireless unit 224 coupled to an antenna 226 to facilitate a wireless connection to a network. The wireless unit 224 may implement one or more of various wireless technologies, such as Wi-Fi, Bluetooth, RF, and so on. In one implementation, the wireless unit 224 configured with a short range wireless technology (e.g., Bluetooth) may be used to communicate with other local devices, such as the user's personal communication device 144 (e.g., portable digital assistant, cellular phone, smart phone, etc.). As one example, a voice communication device 144 may be proximal to the voice controlled assistant 104 and communicate with the assistant using a Bluetooth connection. When the communication device 144 receives a call, the call may be transferred to the voice controlled assistant 104 to facilitate the conversation with the user. As part of this incoming call, the calling party may be identified and that identity is used by the voice controlled assistant 104 to illuminate the light indicator in a visually customized way that informs the user of the calling party. Additionally, the intended recipient may be identified and the assistant 104 may illuminate the light indicator in a different appearance state associated with the recipient. In this manner, the light indicator functions as a caller ID.

The voice controlled assistant 104 may further be equipped with a haptic feedback mechanism 228 which provides touch perceivable feedback to the user during operation of the control knob 132. As one example implementation, the haptic feedback mechanism 228 may be configured to simulate the feel of rotating a combination lock on an old-fashion safe. Each rotation increment is marked by a vibration intended to resemble a familiar clicking sensation as the user turns the combination lock. In some implementations, the voice controlled assistant 104 may concurrently emit subtle but audible clicking sounds to further simulate a safe.

In some configurations, the personal communication device 144 may run an application 230 that is designed to control or operate the voice controlled assistant 104. For instance, the application 230 may support a user interface (UI) that allows entry of commands via a touch interface or physical buttons. For instance, suppose the user wants to choose a new playlist of music being played by the assistant 104. The application may present a UI that identifies other available playlists and permits the user to select one of the playlists. Upon selection, the companion device 144 sends a signal via the local network to instruct the assistant 104 to change to the new playlist.

In some cases, the application 230 on the companion device 144 may facilitate transactions being carried out by the voice controlled assistant 104. For instance, suppose the user is buying merchandise at an e-commerce company. As part of this transaction, the company may send a verification code to the companion device 144 for display. The user can then enter the verification code via the control knob 132 on the voice controlled assistant 104 to complete the transaction. A more specific example is provided below with reference to FIG. 10.

In one implementation, user profiles may be maintained in the memory 204. The user profiles may include a user name, an identifier, an email address, a phone number, PIN, and the like. The information in the user profiles may be used by the code analyzer 142 to confirm the code. Also, each user profile includes an appearance state for the light indicator. In this manner, the appearance state is associated with a corresponding user so that information about a user (e.g., name, phone number, etc.) may be used to retrieve the appropriate appearance state. In certain cases, the appearance state is unique to a single user. In other cases, the appearance state may be used to represent an entity or group of users (e.g., grandparents).

The voice controlled assistant 104 is designed to support audio interactions with the user, in the form of receiving voice commands (e.g., words, phrase, sentences, etc.) from the user and outputting audible feedback to the user. Accordingly, in the illustrated implementation, there are no keypads, joysticks, keyboards, touch screens, and the like. Further there is no display for text or graphical output. In one implementation described below, the voice controlled assistant 104 includes a few control mechanisms, such as the knob 132, two actuatable buttons, and possibly power and reset buttons. But, otherwise, the assistant 104 relies primarily on audio interactions.

Accordingly, the assistant 104 may be implemented as an aesthetically appealing device with smooth and rounded surfaces, with apertures for passage of sound waves, and merely having a power cord and optionally a wired interface (e.g., broadband, USB, etc.). In some implementations, a power light may be included at the base or bottom of the assistant 104 to indicate when the device is powered on. An on/off power switch may further be included in some configurations.

In the illustrated implementation, the assistant 104 has a housing of an elongated cylindrical shape. Apertures or slots are formed in a base end to allow emission of sound waves. A more detailed discussion of one particular structure is provided below with reference to FIGS. 3-7. Once plugged in, the device may automatically self-configure, or with slight aid of the user, and be ready to use. As a result, the assistant 104 may be generally produced at a low cost. In other implementations, other I/O components may be added to this basic model, such as additional specialty buttons, a keypad, display, and the like.

Figure 3:
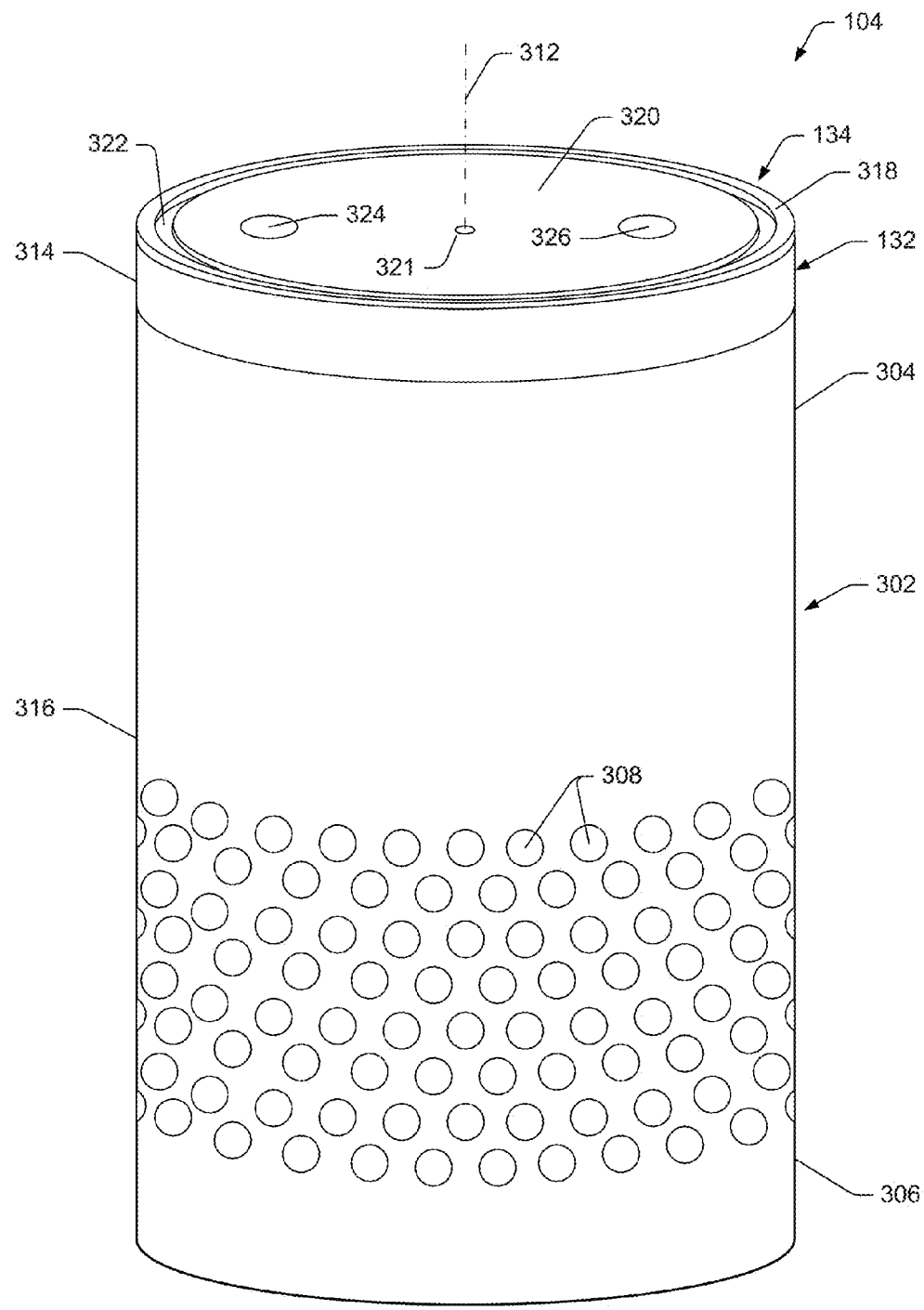
FIG. 3 is a perspective view of one implementation of the voice controlled assistant of FIG. 1 to illustrate a control knob integrated with a cylindrical housing of the voice controlled assistant, and a light indicator arranged at an upper edge of the control knob.

FIG. 3 is a perspective view of one example implementation of the voice controlled assistant 104. The assistant 104 has a cylindrical body or housing 302 with an upper or top end 304 and a lower or base end 306. The base end 306 of the housing 302 has multiple openings or apertures 308 to permit emission of sound waves generated by the speakers (not shown in FIG. 3) contained within the housing. In other implementations, the openings 308 may be in other locations, such as a band about the middle of the cylindrical housing or closer to the top end 304. The openings 308 may be arranged in any layout or pattern, essentially anywhere on the device, depending in part on the location of the one or more speakers housed therein.

One implementation of the control knob 132 is illustrated in FIG. 3 as an annular wheel-like knob mounted near the top end 304 of the housing 302 to rotate about a center axis 312 of the cylindrical body defining the housing. The knob 132 has a smooth outer surface 314 that is substantially vertically and radially flush with an outer surface 316 of the housing 302. For instance, the housing's outer surface 316 is at a first radius from the center axis 312 and the knob's outer surface 314 is at a second radius from the center axis 312, and the first and second radii are approximately equal. In this manner, the knob 132 maintains the smooth cylindrical shape of the housing 302 to promote an elegant design where the knob 132 seamlessly integrates with the cylindrical housing 302 and does not conspicuously stand out as a separate appendage. Additionally, the knob 132 enjoys a large diameter to permit more precise mechanical movement and control. The knob 132 may be infinitely rotatable in either direction, with no mechanical limit for clockwise or counterclockwise rotation. As a result, a user may easily and finely control various functions by grasping and turning the knob 132 or by using a finger to rotate the knob 132.

The knob 310 has an upper peripheral edge that is fitted with an edge pipe 318, which may be used as an annular signaling indicator. The edge pipe 318 is a light pipe that is used to channel light emitted by the light source 230. The edge pipe 318 is formed of a light transmissive material that may receive light from the light source 200 (e.g., one or more LEDs) so that the edge pipe 318 may be illuminated. Due to its location at the top end 304, the edge pipe 318, when illuminated, is visible from all directions and may be easily seen in the dark to aid in user operation of the knob 132. The edge pipe 318 may be illuminated using a single color or many different colors. Similarly, the pipe 318 may be illuminated as a solid annular ring or as individual segments. The segments may even be controlled in a way to provide an animated appearance (e.g., flashing segments, turning segments on/off in a pattern, differing intensities of light emitted by the LEDs, etc.). The various appearances may be assigned to different functions, such as to differentiate rest mode from operational mode, or to communicate different states of operation (e.g., when in mute or privacy), or to communicate different types of functionality (e.g., receiving or storing a message), or to illustrate associated knob operation (e.g., illuminating more segments as the user turns the knob), and so forth.

Figure 4:
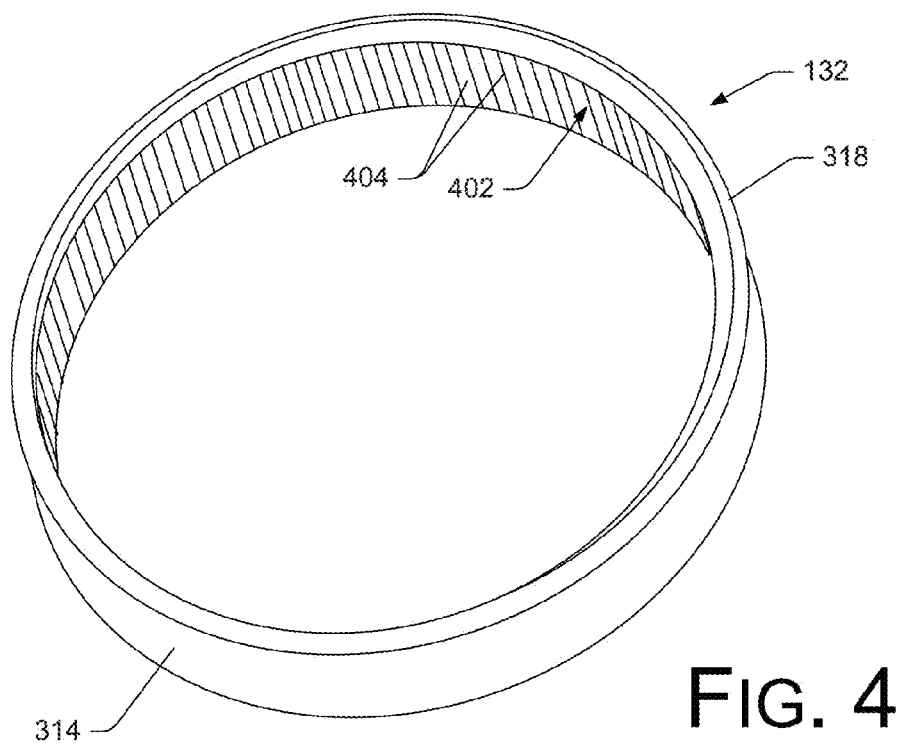
FIG. 4 shows one example implementation of the control knob of FIG. 3 in more detail.

FIG. 4 shows the control knob 132 of FIG. 3 in more detail. The knob 132 is an annular ring member having an outer surface 314 and an inner surface 402. In one implementation, the knob is constructed with a thickness between the inner surface 402 and the outer surface 314 and an overall weight that provides a quality tactile experience with improved precision feel. The edge pipe 318 is arranged around one edge or lip of the knob 132. The inner surface 402 has a set of gear teeth 404 that engage a complementary gear member internal to the knob 132.

Figure 5:
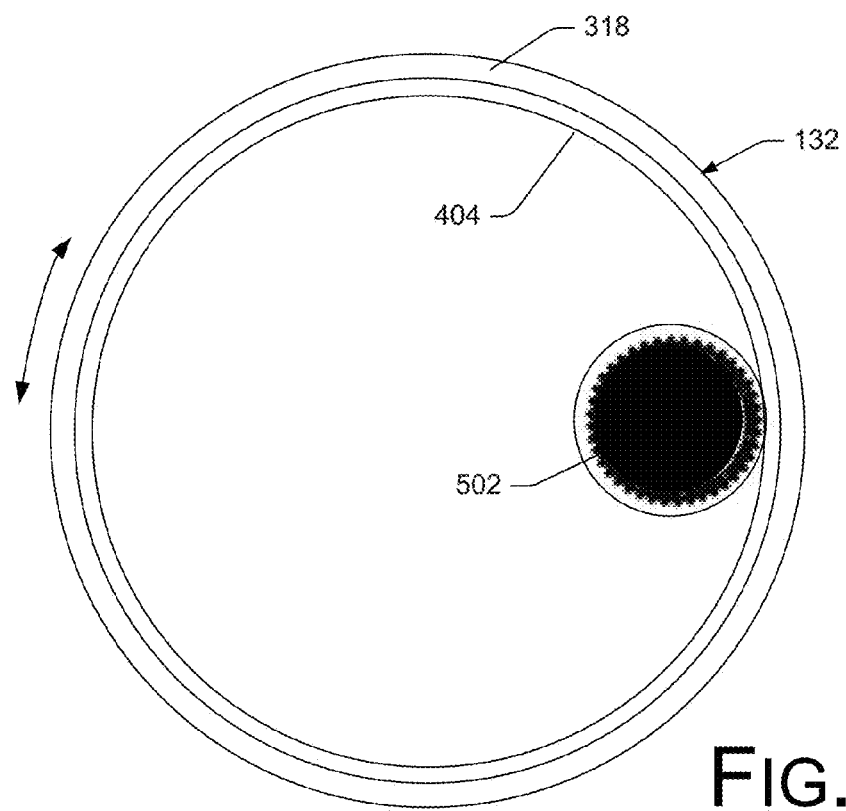
FIG. 5 shows one example implementation of the control knob of FIG. 3 integrated with complementary internal gearing within the voice controlled assistant.

FIG. 5 shows one example mechanical arrangement in which the knob 132 engages a complementary gear member 502. Rotation of the knob 132, either clockwise or counterclockwise, causes mechanical movement of the inner gear teeth 404 relative to the complementary gear member 502, which in turn rotates the gear member 502 in the same direction. The gear member 502 is operationally coupled to the rotary transducer 138 that generates an electrical signal based on the movement of the gear member 502.

With reference again to FIG. 3, the knob 132 rotates around a circular end cap 320, which remains stationary. The circular end cap 320 may be formed of a hard, protective material, such as plastic. In such implementations, a center hole 321 may be provided in the end cap 320 to permit sound transmission to one or more microphones positioned beneath the end cap 320. Alternatively, the end cap 320 may be formed of a material that is transmissive to sound waves, as one or more microphones may be placed beneath the surface. In one implementation, a groove 322 is formed between the edge pipe 318 of the knob 132 and the end cap 320. The groove 322 recesses into the assistant from the outer surface formed by the end cap 320. The groove 322 may be, for example, at a depth of 1 mm to 5 mm, with 2 mm being one example suitable distance. In still another implementation, a sound transmissive material, such as a mesh, may be used to cover the groove 322 or components, such as microphones, positioned in the groove.

Two actuatable buttons 324 and 326 are exposed through corresponding openings in the end cap 318. These buttons 324 and 326 may be implemented, for example, with on/off states and may be assigned to control essentially any binary functionality. In one implementation, the left button 324 may be used to enable/disable the microphones (i.e., place the assistant in a privacy mode) and the right button 326 may be used for any other assignable function. The buttons 324 and 326 may be configured with different tactile profiles (e.g., different surfaces, shapes, texture, etc.) to exhibit different tactile experiences for the user, so that the buttons may be identified in low or dark lighting conditions simply through touch. The buttons may also be configured to be illuminated for easy viewing in low or dark lighting conditions.

One or more microphones may be positioned in the groove 322. There are many possible arrangements of the microphones in the microphone array. In one implementation, the assistant 104 is equipped with six microphones in the groove 322 between the knob 132 and the end cap 320 and a seventh microphone is positioned centrally at the axis 312 beneath the surface of the end cap 320. If the end cap 320 is formed of a hard, protective plastic, an aperture or opening 321 may be formed at the center point above the seventh microphone. Alternatively, a pattern of holes may be stamped into the plastic end cap 320 to generally permit passage of sound waves to the underlying microphones.

Figure 6:
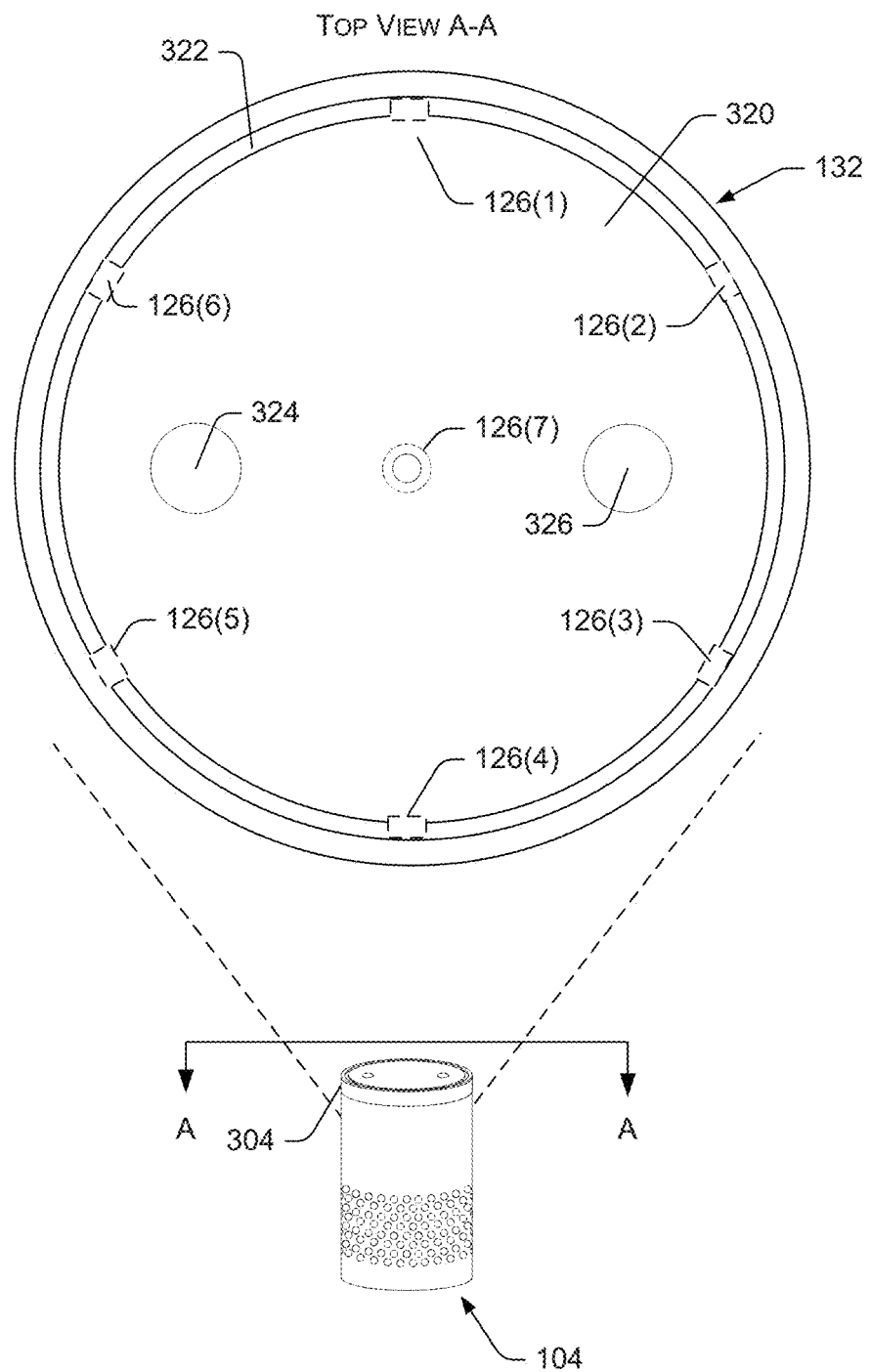
FIG. 6 shows a top down view of the voice controlled assistant of FIG. 3 to illustrate a light edge pipe arranged on the control knob and an example arrangement of microphones to form a microphone array.

FIG. 6 shows one example arrangement of microphones in the top end 304. More particularly, FIG. 6 shows a top down view of the voice controlled assistant 104 taken along line A-A to illustrate the end cap 320 at the upper end 304 of the housing 302. In this example, the microphone array has seven microphones 126(1), . . . , 126(7). Six of the microphones 126(1)-(6) are placed within the groove 322 between the perimeter of the end cap 320 and the knob 132, and are oriented so that the microphones are exposed into the groove 322 to receive sound. A mesh or other sound transmissive material may be placed over the microphones to prevent dust or other contaminants from affecting the microphones. A seventh microphone 126(7) is positioned at the center point of the circular end cap 320 and beneath an opening in the end cap 320 or a sound transmissive material. It is noted that this is merely one example arrangement. Arrays with more or less than seven microphones may be used, and other layouts are possible.

Figure 7:
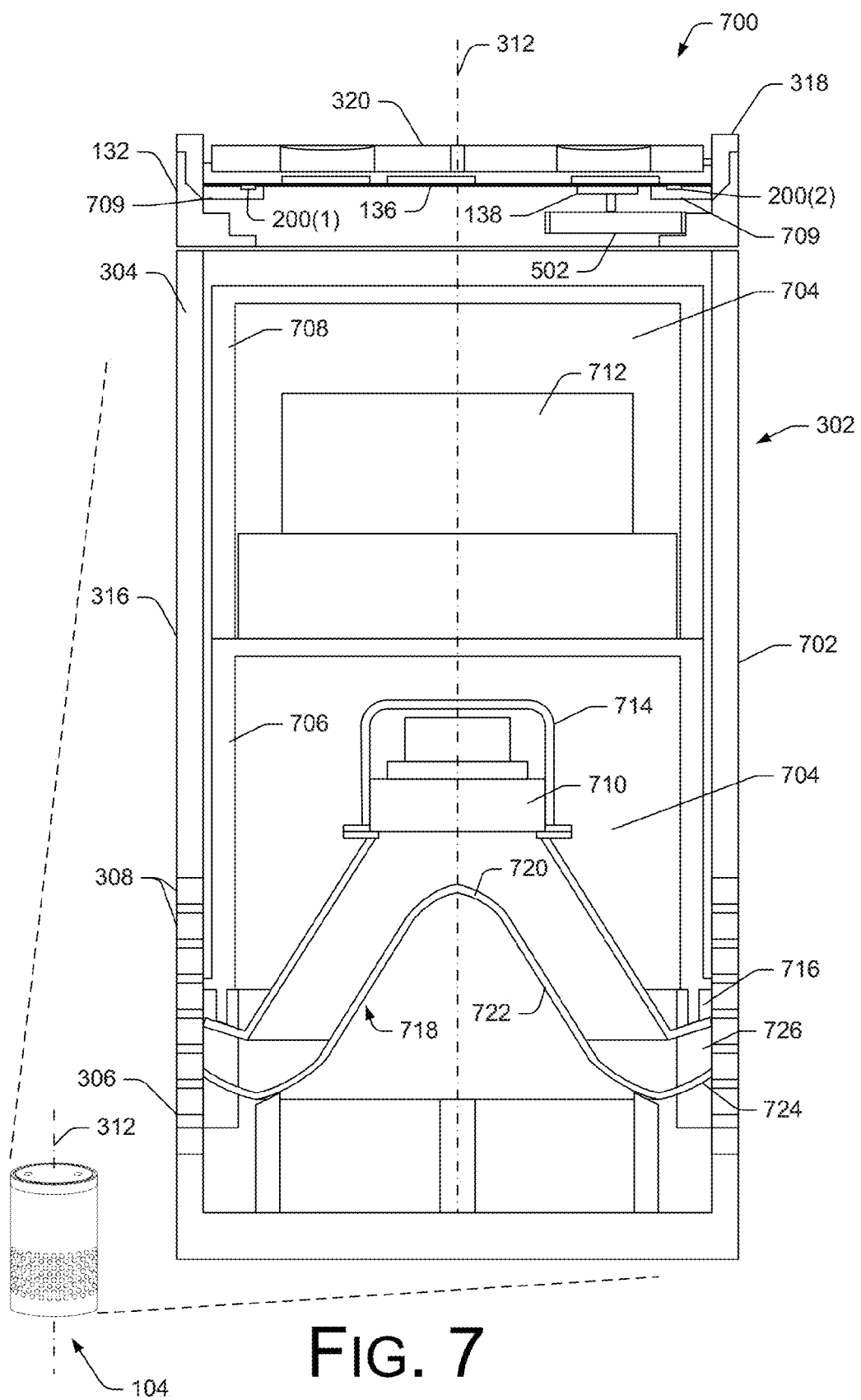
FIG. 7 is a cross sectional view of the voice controlled assistant of FIG. 3 according to one example implementation in which two speakers are coaxially aligned.

FIG. 7 is a cross sectional view 700 of the voice controlled assistant 104 taken along a plane that intersects the center axis 312 of the cylindrical-shaped housing 302. The housing 302 has an elongated, cylindrical-shaped middle section 702 extending between the first, lower or base end 306 and a second, upper, or top end 304. The cylindrical-shaped middle section 702 has a smooth outer surface 316 and due to the rounded shape, the two ends 304 and 306 are circular in shape. The base end 306 is designed to rest on a surface, such as a table 108 in FIG. 1, to support the housing 302. In this position, the top end 304 is distal and upward relative to the base end 306.

The housing 302 defines a hollow chamber 704. Within this chamber 704 are two skeletal members: a first or lower skeletal member 706 that provides structural support for components in the lower half of the chamber 704 and a second or upper skeletal member 708 that provides structural support for components in the upper half of the chamber 704.

The computing components 136 are mounted to the upper skeletal member 708, with one example configuration having the components mounted on a printed circuit board (PCB) positioned just below the end cap 320. The computing components 136 may include any number of processing and memory capabilities, as well as power, codecs, network interfaces, and so forth. Example components are shown in FIG. 2. The PCB may further hold the microphones 126(1)-(M), which are not shown in FIG. 7. It is noted that some or all of the computing components 136 may be situated in other locations within the housing 302.

A light source 200 for the edge pipe 318 may be mounted to the PCB. In one implementation, the light source 200 may be formed as multiple (e.g., 12) multi-colored light sources, such as RGB LEDs. In FIG. 7, two LEDs 200(1) and 200(2), are shown mounted to the PCB 136 and optically connected to a light pipe diffusion ring 709, which is also mounted to the PCB. The light pipe diffusion ring 709 is optically coupled to the edge pipe 318. In this manner, each of the LEDs 200 may emit light in various colors, which is conveyed through the diffusion ring 709 to the edge pipe 318 exposed on the other rim of the knob 132 so that the light ring can be viewed from all directions. In this configuration, the light indicator 132 is composed the light indicator controller 140, the light source 200, and the optical illumination components of the edge pipe 318 and diffusion ring 709.

Two speakers are shown mounted in the housing 302. A first speaker 710 is shown mounted within the lower skeletal member 706. The first speaker 710 outputs a first range of frequencies of audio sound. In one implementation, the first speaker 710 is a mid-high frequency speaker that plays the middle to high frequency ranges in the human-perceptible audible range. A second speaker 712 is shown mounted within the upper skeletal member 708 elevationally above the first speaker 710 with respect to the base end 306. In this implementation, the second speaker 712 is a low frequency speaker that plays the low frequency ranges in the human-perceptible audible range. The mid-high frequency speaker 710 is smaller than the low frequency speaker 712.

The two speakers 710 and 712 are mounted in a coaxial arrangement along the center axis 312, with the low frequency speaker 712 atop the mid-high frequency speaker 710. The speakers are also coaxial along the center axis 312 to the microphone array, or more particularly, to the plane containing the microphone array. The middle microphone 126(7) (not shown in this figure) is positioned at the center point and lies along the center axis 312. Further, the two speakers 710 and 712 are oriented to output sound in a downward direction toward the base end 306 and away from the microphones mounted in the top end 304. The low frequency speaker 712 outputs sound waves that pass through one or more openings in the lower skeletal member 706. The low frequency waves may emanate from the housing in any number of directions. Said another way, in some implementations, the low frequency speaker 712 may function as a woofer to generate low frequency sound waves that flow omni-directionally from the assistant 104.

The mid-high frequency speaker 710 is mounted within a protective shielding 714, which provides a shield to the sound waves emitted from the low frequency speaker 712. Small openings or slots 716 are formed in the lower skeletal member 706 near the base end 306 of the housing 302 to pass sound waves from the chamber 704, although the low frequency waves need not be constrained to these slots.

The mid-high frequency speaker 710 emits mid-high frequency sound waves in a downward direction onto a sound distribution cone 718 mounted to the base end 306. The sound distribution cone 718 is coaxially arranged in the housing 302 along the center axis 312 and adjacent to the mid-high frequency speaker 710. The sound distribution cone 718 has a conical shape with a smooth upper nose portion 720, a middle portion 722 with increasing radii from top to bottom, and a lower flange portion 724 with smooth U-shaped flange. The sound distribution cone 718 directs the mid-high frequency sound waves from the mid-high frequency speaker 710 along the smooth conical surface downward along the middle portion 722 and in a radial outward direction from the center axis 312 along the lower flange portion 724 at the base end 306 of the housing 302. The radial outward direction is substantially perpendicular to the initial downward direction of the sound along the center axis 312. In this manner, the sound distribution cone 718 essentially delivers the sound out of the base end 306 of the housing 302 symmetrical to, and equidistance from, the microphone array in the top end 304 of the housing. The sound distribution cone 718 may also have the effect of amplifying the sound emitted from the mid-high frequency speaker 710.

Slots 726 are formed between the lower skeletal member 706 and the cone 718 to permit passage of the sound waves, and particularly the high frequency sound waves, emitted from the mid-high frequency speaker 710. In addition, apertures 308 are formed in the outer housing 702 to permit emission of the sound waves.

The knob 132 is rotatably mounted at the top end 304 of the housing 302 to rotate about the center axis 312. The knob 132 is mechanically coupled to the complementary gear 502. As the gear rotates, a rotary transducer 138 outputs a signal indicative of that rotation that may be passed to other modules to control various functions.

Although not shown, the haptic feedback mechanism 228 may be connected to provide touch perceptible vibrations or other sensations through the knob 132. In one implementation, a vibration mechanism may be coupled to the internal complementary gear 502. A touch sensation applied to the gear 502 may then be mechanically translated through to the knob 132.

Figure 8:
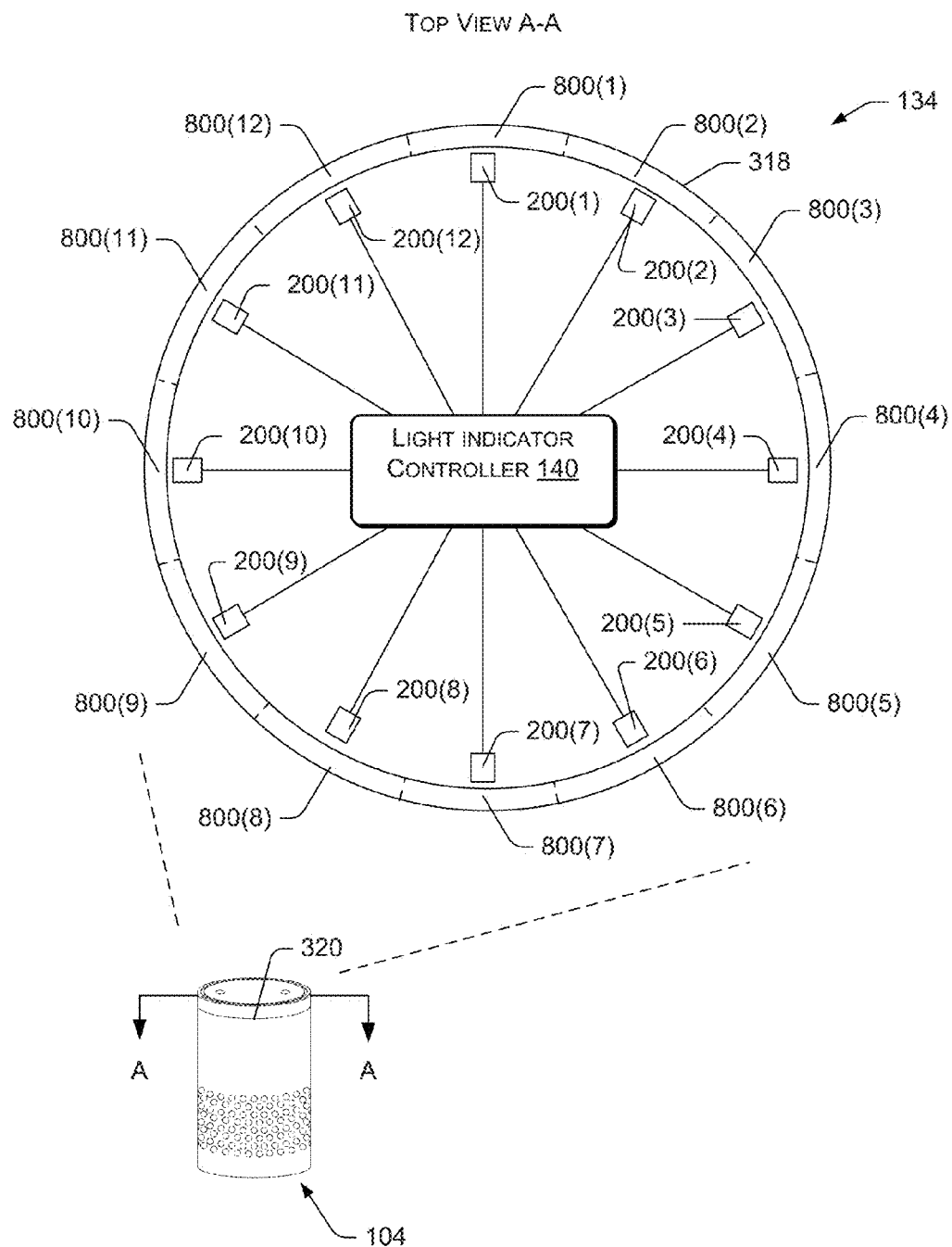
FIG. 8 shows a top down view of the voice controlled assistant of FIG. 3 taken just beneath the outer housing to illustrate one example implementation of a light indicator formed of an array of LEDs used to illuminate multiple segments in a light edge pipe.

FIG. 8 shows a top down view of the voice controlled assistant 104 taken through line A-A just beneath the outer end cap 320 to illustrate one example implementation of the light indicator 134. The light indicator 134 includes the light indicator controller 140 electrically coupled to control an array of multiple LEDs 200(1), . . . , 200(12), which are uniformly arranged about the center axis. The LEDs 200(1)-(12) are optically coupled to the edge pipe 318 to form twelve illumination segments 800(1), . . . 800(12) that can be selectively illuminated. The light indicator controller 140 individually controls each of the LEDs 200, instructing the LEDs as to color, on/off state, light intensity, timing, and so forth. In this manner, the controller 140 can control the array of LEDs 200(1)-(12) to provide essentially unlimited indication or appearance states.

Figure 9:
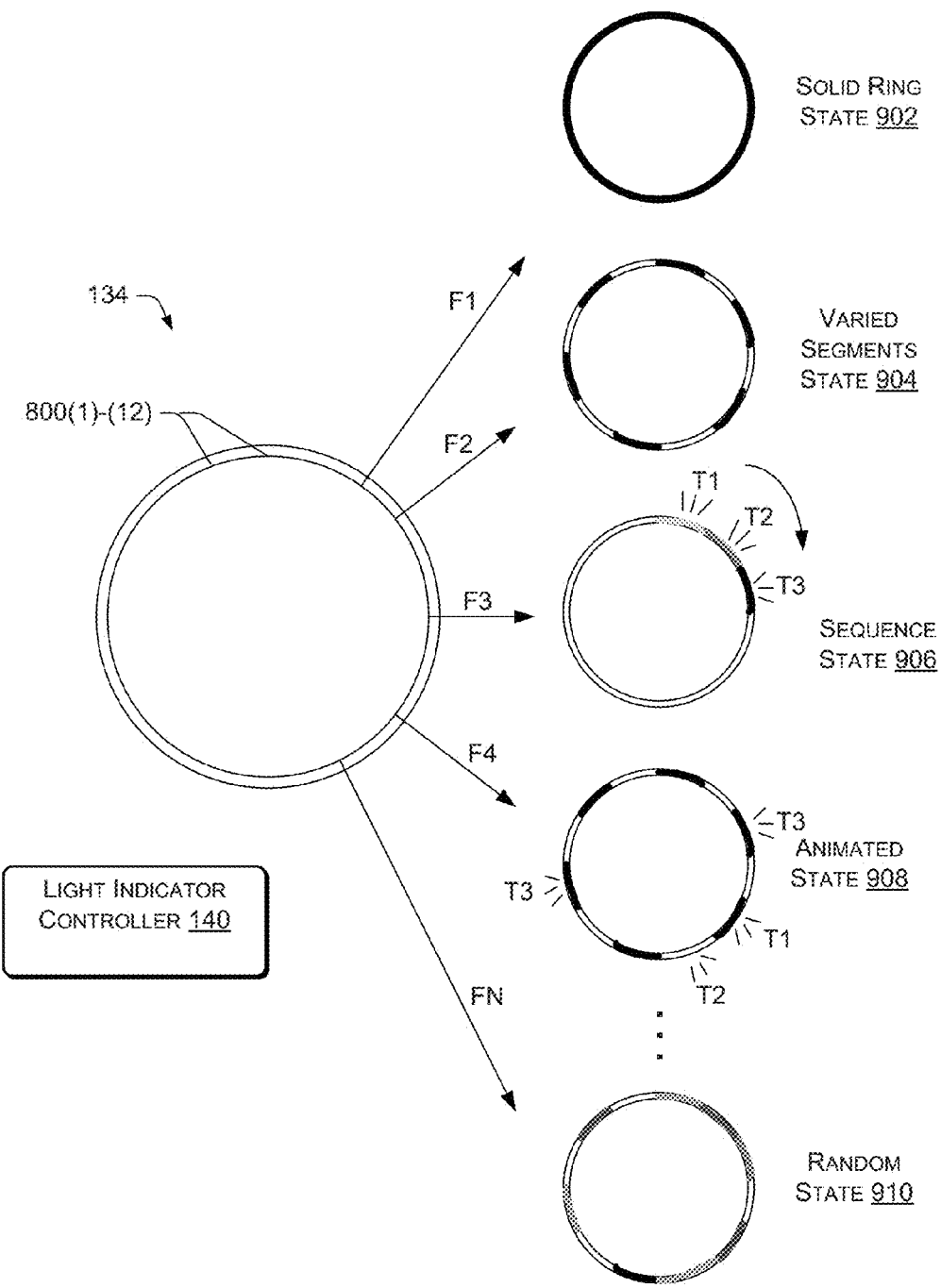
FIG. 9 illustrates a variety of example lighting arrangements that may be exhibited by the light indicator depending upon an associated function.

FIG. 9 shows a variety of example appearance states that may be exhibited by the light indicator 134 depending upon an associated function. Since each of the twelve light segments may be individually controlled with many different color and timing options, there are infinitely many different functions that can be assigned to the appearance states. For instance, in this illustration, N functions F1, F2, . . . , FN are associated with different types of appearance states that involve timing of segment illumination. Varying colors of each segment within each of these examples adds another dimension of appearance states that might be used to represent available functions.

In FIG. 9, one example appearance state involves turning on all of the light segments 800 concurrently to produce a solid ring 902. A first function F1 may be assigned to the solid ring 902, or multiple functions may be mapped to associated color variations of the solid ring 902. For instance, a solid green ring may represent a normal "on" state, and a solid red ring may represent a mute condition. Another appearance state might include turning the solid ring 902 on and off, so that the indicator appears to blink. This may represent yet another function, such as when the assistant 104 receives a voice message or is in call waiting. In some cases, different colors may be used to represent different people who left messages, with the colors being personalized by the user to represent different individuals.

Another example appearance state involves varying which segments are turned on or off, as represented by the varied segments state 904. Here, some of the segments may be off while other segments are one. Any number of combinations of the twelve segments may be used to create various appearance states to which functions, such as function F2, can be assigned. These varied segment states may be assigned, for example, to functions such as alerts, reminders, calendars, and such.

Still another example appearance state is the sequence state 906 where segments are turned on and off in a sequence. For instance, in FIG. 9, a function F3 may be associated with a sequence that begins with segment 800(1) and turns on subsequent light segments 800(2), 800(3), etc. in a clockwise manner at times T1, T2, T3, etc. One suitable function that might be associated with a sequence state 906 is to provide visual feedback while the user adjusts the control knob 132. The user may, for example, adjust the volume of the voice controlled assistant 104 by rotating the knob 132 clockwise. In response, the light indicator controller 140 may direct the LEDs 200 to illuminate the segments 800 in a sequential pattern of 800(1), 800(2), . . . , and so on. In another example, this sequence state appearance may be used for a timer function, where the light sequence slowly turns off in reverse order as time expires.

The sequence appearance state 906 may also be used for measurement related functions, such as temperature or barometer readings. For instance, the user may ask the voice controlled assistant 104 to provide the current temperature in the room or at a remote vacation resort. As an example, the user may ask, "What is the temperature in Maui?" In response, the controlled assistant 104 will determine the correct response (locally or via a query to the cloud services) and provide an audio response. For instance, the assistant 104 may respond, "The weather in Maui is 86 degrees". As part of this response, the light indicator controller 140 may use the sequence appearance state to turn on nine LEDs with a red color to illuminate the corresponding segments 800(1)-800(9) so that three-quarters of light indicator ring is red, thereby visually conveying to the user a hot temperature measure akin to a thermometer.

Another example appearance state is the animated state 908 where segments are turned on and off to provide an animation effect. For instance, in FIG. 9, a function F4 may be associated with an appearance where segment 800(5) is illuminated at time T1, segment 800(6) at time T2, and segments 800(3) and 800(9) at time T3. The animated appearance state 908 may be used for essentially any associated function, with examples being an alert, a warning, intruder detection, receipt of communication from a pre-identified person, and so forth.

Yet another example appearance state is the random state 910 where segments are turned on and off, at different colors, in a pseudo-random manner. Again, the random appearance state 910 may be used for essentially any associated function, with one example being for merely decorative purposes for music playback.

The appearance states provided in FIG. 9 are merely representative examples and are not intended to be limiting in any way. For instance, appearance states may be coordinated with a calendar application running on the assistant 104 (or in the cloud services). A color scheme or animation pattern may be selected based on a specific date. During Christmas season, red and green colors may be used more prominently, whereas an orange/black color palette is selected during Halloween and a red/white color palette is selected for Valentine's Day. Another calendar item may be a person's birthday, which may introduce fun animated states that are activated together with the playing of a song for "Happy Birthday". In such cases, the illumination may be for purely decorative reasons. Furthermore, although the description refers to the LEDs as being on or off, such LEDs may be controlled through various levels of brightness or grayscale to provide an even more varied appearance. In another example appearance state, the light indicator may operate in a directional state in which at least some of the LEDs are illuminated to exhibit a direction of input or output of the audio sound. For instance, when a user is speaking, the LED segments on the side of the rim closest to the user may be illuminated to indicate that the audio sound is being received from that direction.

In some implementations, there may be two or more voice controlled assistants in the same room or area. In these cases, the light indicators may be coordinated through inter-device communication (e.g., Bluetooth, Wi-Fi, LAN, etc.) or via a central computing node, such as the cloud services. For instance, multiple assistants may be used to convey equalizer information where each assistant represents an associated band. In another situation, games may be played across multiple devices, where the light indicator is lit to identify which assistant is active during game play. In still another situation, a customized visualization or warning directed to one user may be transferred among multiple assistants as the user physically moves from one assistant toward another assistant (e.g., such as walking across a room, or from one room to the next).

As noted above, the voice controlled assistant 104 may further be used to facilitate transactions with remote entities, such as online retailers, banks, financial institutions, government institutions, and so forth. For these transactions, the user may be asked to enter a code, which may be transaction based, associated with the user, or some other identification value. There are many different usage scenarios involving entry of some information. As examples, an online purchase may involve a transaction verification code, application of parental codes may involve a private code, user account information may involve user-associated PINS, health care orders may request a user's identifier (e.g., social security number, driver's license, etc.), and so forth.

For purposes of continuing example, suppose a user wants to refill a prescription for medicine. The user may be communicating with a pharmacy to place the order, and as part of the process, the pharmacy requests entry of a code to verify that the particular user is indeed submitting the order. This scenario is described further with reference to FIG. 10, as follows.

Figure 10:
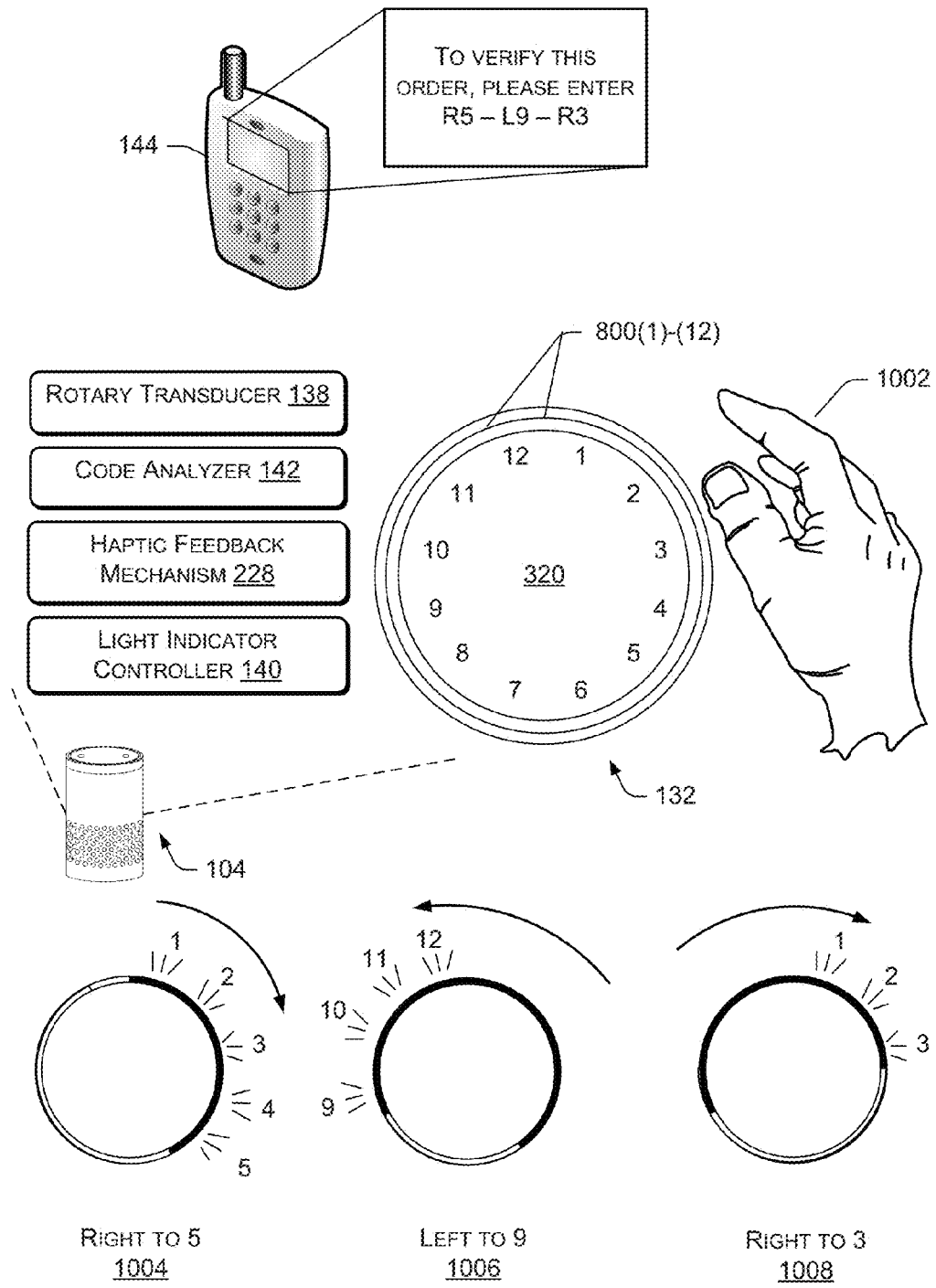
FIG. 10 illustrates one implementation of non-verbal code entry using the control knob of the voice controlled assistant to enter manually a code through a series of knob rotations.

FIG. 10 illustrates an implementation of non-verbal code entry using the control knob 132 of the voice controlled assistant 104. The user can manually enter the code through a series of knob rotations. Continuing the pharmacy example, suppose the pharmacy requires a three-digit code to confirm that the particular user is placing the refill order. In FIG. 10, the pharmacy may send the code to the user's personal device 144, which is then provided to the user visually on a display (as shown) or audibly in a mode where the user listens privately to the device. In this case, the UI might instruct the user that "To verify this order, please enter: R5-L9-R3". The values "R5", "L9", and "R3", in the particular sequence, form the verification code for this order. The user can view the code on the personal device 144.

Using his hand 1002, the user can manually rotate the knob 132 to enter the code. In this example, the value "R5" means to rotate the knob right (or R) to position 5. Also in this example, there are 12 positions associated with the twelve LEDs. In other configurations, there may be more or less than twelve positions or no positions at all, as will be explained further below. The user rotates the knob 132 to the right (or clockwise) to position 5 as indicated by the "right to 5" step 1004. The rotary transducer 138 provides a signal representative of this rotation, and the code analyzer 142 interprets the signal to understand the clockwise direction and movement to position 5. In addition, the haptic feedback mechanism 228 may provide a clicking sensation for each position the knob is rotated (i.e., for each position of 1-2-3-4-5). Further, the light indicator controller 140 may illuminate, in order, the LEDs 800(1), 800(2), 800(3), 800(4), and 800(5) as the user rotates the knob to the right. Audible sounds may further be emitted with each position. In this way, the user receives multi-sensory feedback as the first value of the code is entered.

Next, the user rotates the knob 132 to the left (or counterclockwise) to position 9 as indicated by the "left to 9" step 1006. The rotary transducer 138 provides a signal representative of this counterclockwise rotation, and the code analyzer 142 once again interprets the signal to understand the leftward turn to position 9. As before, the haptic feedback mechanism 228 may provide a clicking sensation for each position 5-4-3-2-1-12-11-10-9. Further, the light indicator controller 140 may turn off the LEDs 800(5), 800(4), 800(3), 800(2), and 800(1) as the user rotates the knob to the left and then illuminate LEDs 800(12), 800(11), 800(10), and 800(9). Once again, audible clicks may be output with each position.

Finally, for this three-digit code, the user rotates the knob 132 to the right (or clockwise) to position 3 as indicated by the "right to 3" step 1008. The rotary transducer 138 provides a signal representative of this clockwise rotation, and the code analyzer 142 interprets the signal. As before, the haptic feedback mechanism 228 may provide a clicking sensation for each position and the light indicator controller 140 may turn off the LEDs 800(9), 800(10), 800(11), and 800(12) as the user rotates the knob to the right and then illuminate LEDs 800(1), 800(2), and 800(3). Once again, audible clicks may be output with each position.

In this way, the user enters the three-digit verification code to complete the prescription refill. This example is merely to illustrate one possible way to enter a code using the knob. There are many others. For instance, the code may be more akin to a combination lock, where one LED segment is illuminated to indicate pointer and the user is asked to rotate the knob three complete circles clockwise and stop at position 3, then two complete circles counterclockwise to position 2, then clockwise again to position 10, and finally back to position 7. Further, other illumination patterns may be used. For instance, the light indicator may change colors as the knob is rotated.

In other implementations, numbers, letters, or other types of characters may be provided on the knob 132, the circular end cap 320, or the cylinder housing 302 to aid in entry of the code. In FIG. 10, numbers 1-12 are shown physically printed or written on the end cap 320 at locations corresponding to the twelve light segments of the light indicator. In other implementations, a display (not shown in FIG. 10) may be provided on the voice controlled assistant 104 to show numbers or characters associated with the knob control. As the knob is rotated clockwise or counterclockwise, the numbers or characters are incremented or decremented. One implementation of the device-mounted display is provided below with reference to FIG. 12.

Figure 11:
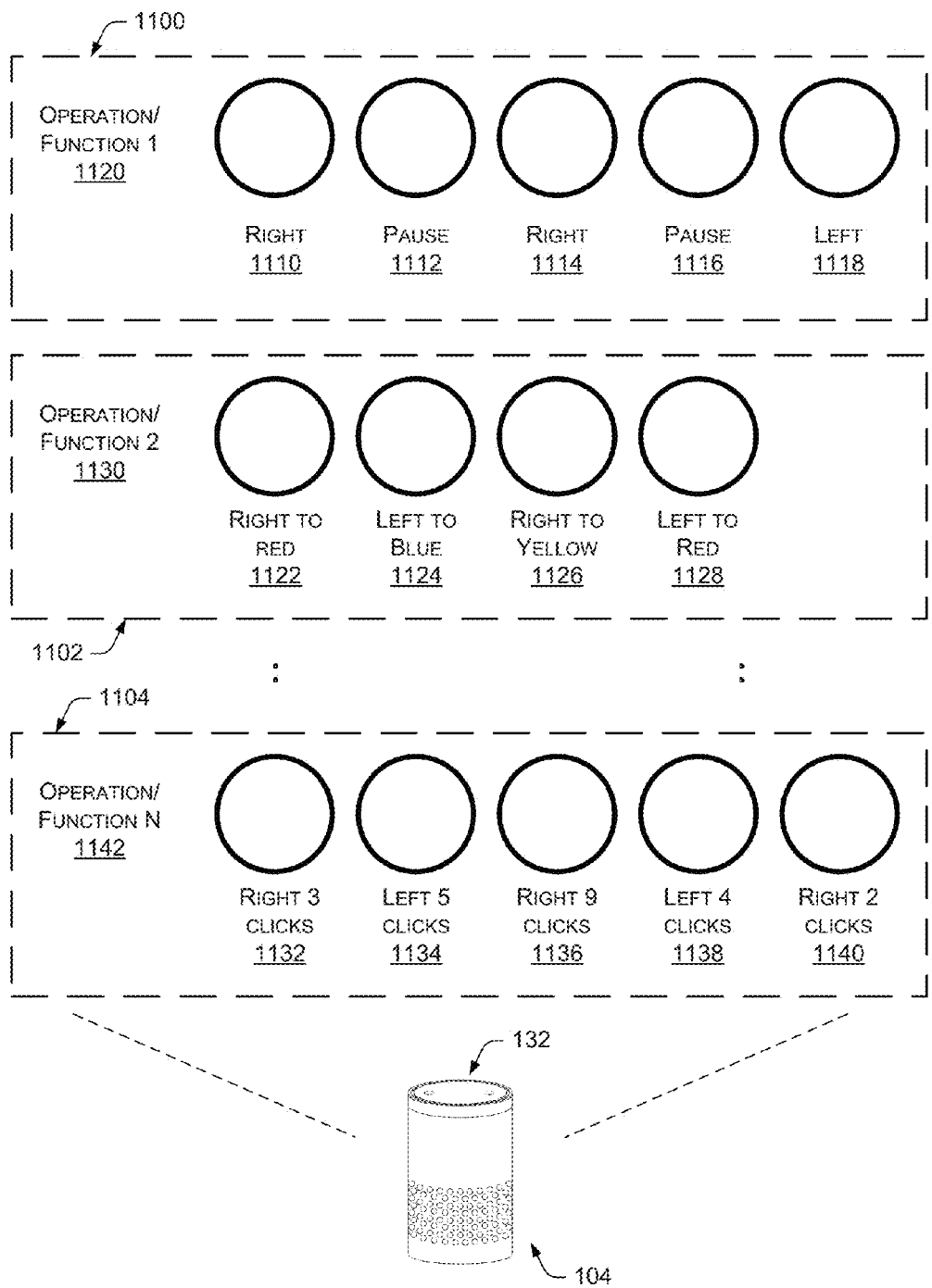
FIG. 11 shows various ways to implement the non-verbal code entry.

FIG. 11 shows another set of example ways to implement the non-verbal code entry using the control knob 132. In this illustration, three different entry techniques 1100, 1102, and 1104 are shown, although these are merely representative and not intended to be limiting. The various combinations of lighting segments, colors, rotation patterns and the like provide practically an unlimited number of entry options.

Each of the entry techniques involves a series of rotations of the knob. In entry technique 1100, the rotation technique involves a sequence of left and right rotations of the knob, without regard for positions. So, to enter a code, the user may be asked to rotate the knob right at 1110 and then pause at 1112. The user may then rotate the knob right again at 1114, pause at 1116, and finish by rotating the knob left at 1118. This sequence of right-pause-right-pause-left conveys an entry code suitable for performing a corresponding operation or function 1120. The pauses enable the code analyzer 142 to differentiate among discrete rotation entries. The pause may be a predetermined threshold time, such as 1-3 seconds.

In entry technique 1102, the rotation technique involves a sequence of rotations coordinated with color changes of the light indicator. As with technique 1100, there is no concept of positions. So, to enter a code, the user may be asked to rotate the knob right until red is emitted from the light indicator at 1122, then left until a blue color is emitted at 1124, then right until a yellow color is emitted at 1126, and then left until the red color shows again at 1128. This sequence of red-blue-yellow-red conveys an entry code suitable for performing a corresponding operation or function 1130.

In entry technique 1104, the rotation technique involves a sequence of rotations coordinated with audible or haptic feedback. In this example, an audible click or a vibration sensation is applied at each interval of rotation of the control knob 132. The number of intervals per full rotation may correspond with the number of light segments (e.g., 12 intervals) or be independent of the number of light segments (e.g., 10 intervals or 20 intervals per full rotation). To enter a code, the user is asked to rotate the knob through a number of clicking sounds and/or sensations for each value. In this example, the user may turn the knob 132 right for three clicks (i.e., sounds and/or sensations) at 1132, left for five clicks at 1134, right for nine clicks at 1136, left for four clicks 1138, and right for two clicks at 1140. This sequence of rotations R3-L5-R9-L4-R2 conveys an entry code suitable for performing a corresponding operation or function 1142.

These entry techniques are merely representative. Many other possibilities exist. In another technique, for example, a time element may be added to the code. For instance, the code may be to turn right for approximately 2 seconds, left for approximately 3 seconds, and right for approximately 1 second. Once again in this case, there is no concept of physical positions of the knob; rather, there is simply a combination of rotational direction and time to enter the code.

In yet another technique, the code may involve a combination of rotating the knob and pressing one or more buttons, such as actuatable buttons 324 and 326. For instance, the code may be to turn the knob 132 to the right while pressing and holding the left button 324 (e.g., see FIG. 6), then press right button 326 twice, and finally, turn the knob back to the left for 3 seconds. As will be appreciated, there are many possible ways to enter a code using any number of combinations of the knob, buttons, time, light segments, voice, gestures, and/or haptic feedback.

While the above examples involve rotation of the control knob 132, it is noted that other rotatable knobs or physical elements (e.g., sliders) may be provided on the voice controlled device 104 to facilitate non-verbal entry of the code. For instance, another rotatable knob may be mounted on the cylindrical housing 302 to permit user entry of the code.

Figure 12:
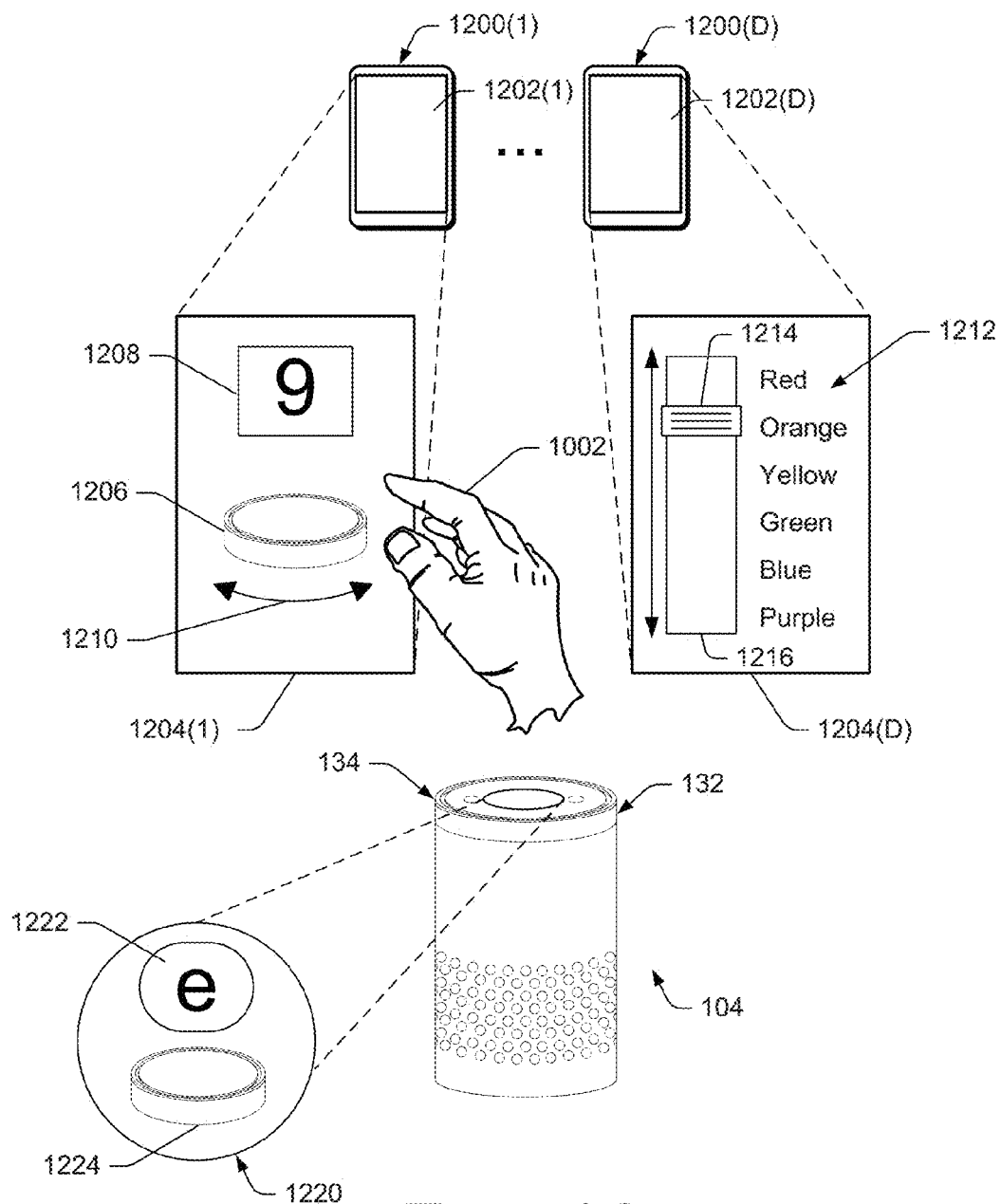
FIG. 12 shows another implementation of manual, non-verbal entry of a code into the voice controlled assistant. In this implementation, a companion application running on another computing device associated with the user is used to enter the code.

FIG. 12 shows another implementation of manual, non-verbal entry of a code into the voice controlled assistant 104. In this implementation, a companion application running on another computing device associated with the user is used to enter the code. The user may have one or more devices 1200(1), . . . 1200(D), such as smart phones, PDAs, tablets, laptops, computers, and so forth. Here, handheld devices 1200(1)-(D) are equipped with respective touch screen displays 1202(1)-(D) to receive user input. In other implementations, physical buttons or actuatable elements on the devices may be used together with, or independent of, the touch screen displays 1202(1)-(D). The devices 1200(1)-(D) are configured to communicate with the voice controlled assistant 104 over a local wireless network, such as Wi-Fi or Bluetooth®.

A companion application is stored and executed on each of the user devices 1200(1)-(D). The companion application may present a user interface that facilitates operation of the voice controlled assistant 104. The companion application may assist with settings control (e.g., volume, treble, base, etc.), application control (e.g., changing tracks in a playlist, listening to voice mails or audible emails, etc.), and so forth. Furthermore, the companion application can aid in manual input of a code.

In this illustration, two example user interfaces (UIs) 1204(1), . . . , 1204(D) are shown for entry of codes. In UI 1204(1), a virtual knob 1206 or image representation of the physical control knob 132 is presented beneath a value region 1208. The user can operate the virtual knob 1206 through touch with his hand 1002, to essentially spin the knob in clockwise and counterclockwise rotation 1210. The user can drag his finger back and forth along the virtual knob 1206 depicted on the display 1202(1). The value region 1208 shows a value (e.g., numbers, letters, combination of numbers and letters, etc.) associated with position of the virtual knob 1206. In this case, a number "9" is displayed to represent that the knob is at a value of 9. As the user turns the virtual knob 1206, various values are incremented, decremented, or otherwise changed in the value region 1208. Accordingly, the user can enter a code by manipulating through touch the virtual knob 1206 to enter a sequence of values akin to operating a lock on a safe. The user could enter, for example, a pre-known PIN, such as R9-L5-R7-L2 (i.e., right until "9" shows in region 1208, left until "5" shows in the region 1208, and so forth).

In the second UI 1204(D), a slider 1212 is depicted on the display 1202(D) to facilitate entry of a code. The user may slide a bar element 1214 vertically (or horizontally in other orientations of the device) over a range 1216 that is associated with values to be used for the code. The values may take on essentially any unique form, such as numbers, letters, symbols, pictures, or colors (as illustrated). In this example, the code may be entered by sliding the bar element 1214 to a sequence of colors. For instance, a code with four values may be orange-purple-green-red. As the user slides the bar element to these associated color values, the light indicator 134 on the voice controlled assistant 104 may be configured to show the associated color for visual feedback to inform the user that he has entered that color.

While two UIs are illustrated, many other types of virtual controls may be presented by the companion application to facilitate non-verbal code entry to the voice controlled assistant 104. These are merely examples, and not intended to be limiting. Furthermore, in other implementations, visual or audio confirmation may be used to authenticate the user as part of the code entry. For instance, the user may be asked to speak a command or phrase for purposes of authentication through voice recognition or verifiable knowledge of a fact or PIN. In other instances, where a camera is present (e.g., on the personal device 1200, the voice controlled assistant 104, and/or elsewhere in the proximity of the user), visual confirmation may also be used as part of the code entry in combination with the various techniques described above.

In still another implementation, the voice controlled assistant may be equipped with a display screen 1220. The screen may be a passive display or a touch screen that enables touch input. The screen may present a UI that resembles that of the UIs 1204(1) or be used to show alphanumeric or other types of characters for use in entry of the code, or to present a virtual knob for rotation. In the illustrated example, the screen 1220 presents a UI with a virtual knob 1222 and an alphanumeric counter 1224.

Figure 13:
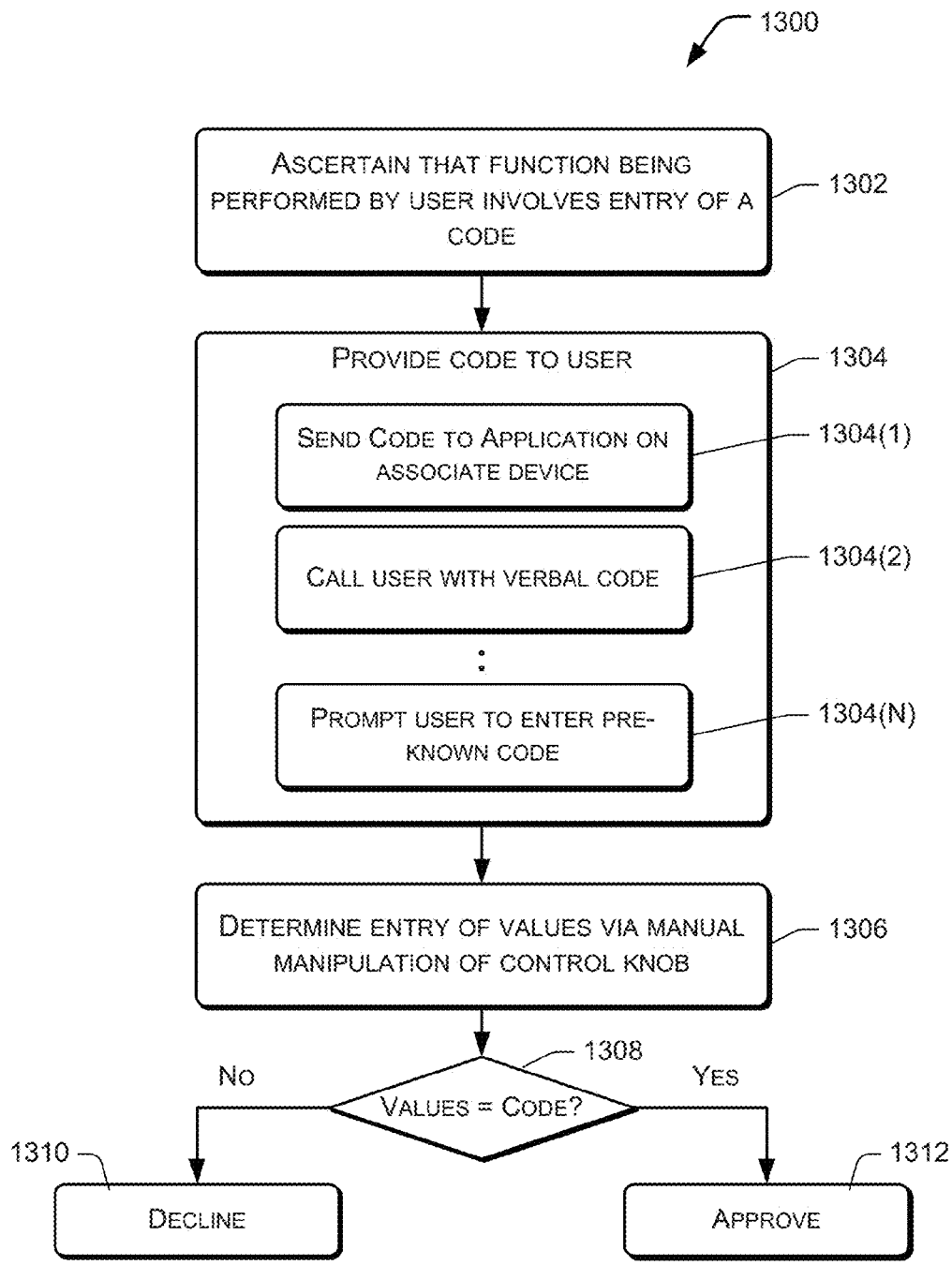
FIG. 13 is a flow diagram showing an illustrative process of entering a code into the voice controlled assistant of FIG. 1 through manual manipulation of the control knob.

FIG. 13 is a flow diagram of an illustrative process 1300 to operate a communication device, such as the voice controlled assistant 104. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For purposes of discussion, the process 1300 is described with reference to the voice controlled assistant 104. However, the process may be performed by other electronic devices.

At 1302, the device ascertains whether a function to be performed involves entry of a code. The function may be for essentially any purpose, such as operation-based functions, application-driven functions, communication-related functions, commerce-related functions, security-related functions, entertainment-related functions, and so forth.

At 1304, the code is provided to the user. This act may be performed in many ways, examples of which are shown as acts 1304(1), 1304(2), . . . , 1304(N). For instance, at 1304(1), the code may be sent to a companion application on the user's personal device. This is shown above in the example scenario of FIG. 10 where the code was transmitted to the device 144. At 1304(2), the code may be communicated audibly by calling the user at the user's designated number and reading the code to the user. At 1304(N), the user may be prompted to simply enter a pre-known code, such as the last four digits of a social security number or PIN.

At 1306, manual manipulation of the control knob 132 is detected and interpreted. In one implementation, the rotary transducer 132 outputs a signal indicative of the mechanical movement. The code analyzer 142 receives this input and interprets the rotation data to ascertain one or more values. Further, the code analyzer 142 may receive information from the light indicator controller 140 to understand what, if any, segments are illuminated and their associated appearance state. From this data, the code analyzer 142 may produce an associated attempt or try at entry of the code.

At 1308, the entered values are evaluated to determine if they match the code. This act may be performed locally by the device 104, where the code analyzer 142 compares the values to a code stored in the assistant's memory 204. Alternatively, the code analyzer 142 of the assistant 104 may cause the values or representations thereof to be transmitted to a remote entity 110 for assessment as to whether they match the code. If the values do not match the code (i.e., the "no" branch from 1308), the entered values are declined as not satisfying the code at 1310 and the associated operation requesting the code is not allowed. On the other hand, if the values match the code (i.e., the "yes" branch from 1308), the entered values are approved as satisfying the code at 1312 and the associated operation requesting the code is allowed.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
a housing having a top end and a base end, the housing extending between the top end and the base end along a center axis;

one or more microphones arranged proximal to the top end of the housing to capture audio and generate an audio signal based on the captured audio;
a processor arranged within the housing to process the audio signal and to perform one or more functions;
memory arranged within the housing and accessible by the processor;
a network interface to communicate with a network;
one or more speakers arranged proximal to the base end of the housing to output audio sound;
a control knob mounted proximal to the top end of the housing to rotate about the center axis;
a rotary transducer to convert rotations of the control knob into one or more control signals;
a code analyzer to interpret the one or more control signals from the rotary transducer to determine one or more values received by rotating the control knob, the code analyzer being further configured to at least one of (1) evaluate whether the one or more values match a code, or (2) transmit the one or more values to a remote system for assessment of whether the one or more values match the code; and
a light indicator arranged to emit light externally of the housing according to multiple appearance states, wherein a first appearance state of the multiple appearance states corresponds to a first value associated with a first control signal received from the rotary transducer, and a second appearance state of the multiple appearance states corresponds to a second value associated with a second control signal received from the rotary transducer.

2. The device of claim 1, wherein the memory stores the code and the code analyzer compares the one or more values to the code in the memory.

3. The device of claim 1, wherein the one or more speakers output an audible sound in coordination with rotation of the control knob.

4. The device of claim 1, further comprising a haptic mechanism to output a touch-perceptive sensation in conjunction with rotation of the control knob.

5. A device comprising:
a housing;
one or more microphones arranged in the housing to receive verbal input;
one or more speakers arranged in the housing;
a processor to perform one or more functions;
memory accessible by the processor;
a control element; and
a module stored in the memory and executable by the processor to facilitate non-verbal input of a code through actuation of the control element; and
a light indicator arranged to emit light externally of the housing according to multiple appearance states, wherein a first appearance state of the multiple appearance states corresponds to a first value of the code received by actuation of the control element, and a second appearance state of the multiple appearance states corresponds to a second value of the code received by actuation of the control element.

6. The device of claim 5, wherein the control element comprises a control knob rotatably coupled to the housing, wherein the code is received through rotation of the knob.

7. The device of claim 6, wherein the code comprises at least one of a series of numbers associated with positions of the knob, a series of letters associated with positions of the knob, a series of alphanumeric digits associated with positions of the knob, a series of rotational directions, or a combination of rotational directions and pauses between rotations.

8. The device of claim 5, wherein the control element comprises a touch screen mounted on the device to receive touch input.

9. The device of claim 5, wherein the one or more speakers output an audible sound in coordination with actuation of the control element.

10. The device of claim 5, further comprising a haptic mechanism to output a touch-perceptive sensation in conjunction with rotation of the control element.

11. The device of claim 5, wherein the one or more functions are selected from a group of functions comprising operation-based functions, application-driven functions, communication-related functions, security-related functions, and entertainment functions.

12. The device of claim 5, further comprising a wireless interface to communicate with a wireless network.

13. A system comprising:
a first device comprising:
at least one microphone to receive audio input and generate a corresponding audio signal;
a processing component to process the audio signal, wherein the processed audio signal is used at least in part to perform one or more transactions;
a network interface to communicate with a network, wherein at least one of the one or more transactions involves communication with a remote device over the network;
at least one speaker to output audio;
at least one control knob to facilitate manual input of a code through a series of rotations of the control knob; and
a light indicator arranged to emit light externally of the first device according to multiple appearance states, wherein a first appearance state of the multiple appearance states corresponds to a first value of the code received by a first rotation of the control knob, and a second appearance state of the multiple appearance states corresponds to a second value of the code received by a second rotation of the control knob.

14. The system of claim 13, further comprising:
a second device separate from the first device, the second device being configured to communicate with a remote entity and to receive the code, the code being used as part of the one or more transactions; and
wherein the code received by the second device is entered into the first device via rotation of the control knob of the first device.

15. The system of claim 14, wherein the second device comprises a communication device with a display, and the code is presented on the display.

16. The system of claim 14, wherein the second device comprises a display to present a user interface, and the code is entered into the first device via the user interface on the second device.

17. A computer-implemented method comprising:
at a computing device:
receiving a verbal request to perform a function;
causing speech processing to be performed on the verbal request;
transmitting a code to an end-user device separate from the computing device;
prompting to enter the code;
detecting manual manipulation of a control element on the computing device, wherein the control element is used to cause entry of multiple values;

emitting light externally of the computing device according to multiple appearance states, wherein a first appearance state corresponding to a first value is emitted upon detection of a first manual manipulation of the control element, and a second appearance state corresponding to a second value is emitted upon detection of a second manual manipulation of the control element;

determining that at least one of the first or second values match the code; and performing the function.

18. A computer-implemented method as recited in claim 17, wherein the determining is performed on the computing device.

19. A computer-implemented method as recited in claim 17, further comprising determining that the verbal request pertains to an operation involving entry of the code.

20. A computer-implemented method as recited in claim 17, wherein the function comprises an online transaction, and further comprising generating the code in association with the transaction.

21. A computer-implemented method as recited in claim 17, further comprising one of displaying or audibly outputting the code on the end-user device separate from the computing device.

22. A computer-implemented method as recited in claim 17, wherein the control element comprises a rotatable knob, and detecting manual manipulation comprises interpreting a sequence of rotations of the knob.

* * * * *